United States Patent
Phillips et al.

(10) Patent No.: US 8,794,532 B2
(45) Date of Patent: Aug. 5, 2014

(54) METHODS AND APPARATUS FOR USE IN ASSOCIATION WITH IDENTIFICATION TOKEN

(75) Inventors: Simon Phillips, York (GB); Stephen Marshall-Rees, Hampshire (GB)

(73) Assignee: Mastercard International Incorporated, Purchase, NY (US)

( * ) Notice: Subject to any disclaimer, the term of this patent is extended or adjusted under 35 U.S.C. 154(b) by 834 days.

(21) Appl. No.: 12/344,863

(22) Filed: Dec. 29, 2008

(65) Prior Publication Data

US 2010/0163616 A1 Jul. 1, 2010

(51) Int. Cl.
*G06K 19/06* (2006.01)

(52) U.S. Cl.
USPC ............ 235/492; 235/375; 235/380; 235/487

(58) Field of Classification Search
USPC .......................... 235/375, 379, 380, 487, 492
See application file for complete search history.

(56) References Cited

U.S. PATENT DOCUMENTS

| | | | |
|---|---|---|---|
| 3,044,606 A | 7/1962 | Frosh | |
| 4,439,941 A | 4/1984 | Halperin | |
| 5,276,311 A | 1/1994 | Hennige | |
| 5,585,787 A | 12/1996 | Wallerstein | |
| 5,914,472 A * | 6/1999 | Foladare et al. | 235/380 |
| 5,953,710 A * | 9/1999 | Fleming | 705/38 |
| 5,955,961 A | 9/1999 | Wallerstein | |
| 6,016,963 A * | 1/2000 | Ezawa et al. | 235/492 |
| 6,224,254 B1 | 5/2001 | Hayek et al. | |
| 6,272,009 B1 | 8/2001 | Buican et al. | |
| 6,315,195 B1 | 11/2001 | Ramachandran | |

(Continued)

FOREIGN PATENT DOCUMENTS

| | | |
|---|---|---|
| WO | 98/33193 A1 | 7/1998 |
| WO | 99/38173 A1 | 7/1999 |
| WO | 00/79546 A1 | 12/2000 |

OTHER PUBLICATIONS

International Standard, "Identification cards—Physical Characteristics", ISO/IEC 7810, Third Edition, Nov. 1, 2003, 18pgs.

(Continued)

*Primary Examiner* — Paultep Savusdiphol
(74) *Attorney, Agent, or Firm* — Buckley, Maschoff & Talwalkar LLC

(57) ABSTRACT

In some embodiments, a method includes supporting an identification token, issued to an account holder by a non-card shaped body of a device; communicating with a proximity coupling device via a wireless interface of the identification token; electrically connecting a communication device to an electrical connector attached to the non-card shaped body; and resetting a security parameter in the identification token in response, at least in part, to at least one signal from the communication device. In some embodiments, the non-card shaped body of the device is a non-card shaped body of a device issued to the account holder. In some embodiments, the communication device is a communication device issued to the account holder. In some embodiments, an apparatus includes an identification token having a wireless interface; a non-card shaped body that encloses the identification token; and an electrical connector attached to the non-card shaped body and adapted to be electrically connected to a communication device; the identification token to communicate with a proximity coupling device via the wireless interface, and to reset a security parameter in the identification token in response, at least in part, to at least one signal from the communication device.

48 Claims, 15 Drawing Sheets

(56) References Cited

U.S. PATENT DOCUMENTS

| | | | |
|---|---|---|---|
| 6,353,811 B1 | 3/2002 | Weissman | |
| 6,561,432 B1 | 5/2003 | Vedder et al. | |
| 6,609,114 B1* | 8/2003 | Gressel et al. | 705/50 |
| 6,631,849 B2 | 10/2003 | Blossom | |
| 6,685,097 B1 | 2/2004 | Housse | |
| 6,715,679 B1 | 4/2004 | Infosino | |
| 6,764,005 B2 | 7/2004 | Cooper | |
| 6,766,952 B2 | 7/2004 | Luu | |
| 6,816,058 B2* | 11/2004 | McGregor et al. | 340/5.26 |
| 6,859,650 B1* | 2/2005 | Ritter | 455/406 |
| 6,863,220 B2 | 3/2005 | Selker | |
| 6,954,133 B2* | 10/2005 | McGregor et al. | 340/5.26 |
| 6,978,940 B2 | 12/2005 | Luu | |
| 7,012,504 B2 | 3/2006 | Tuttle | |
| D522,052 S | 5/2006 | Lubking | |
| 7,103,575 B1* | 9/2006 | Linehan | 705/64 |
| 7,114,659 B2 | 10/2006 | Harari et al. | |
| 7,143,419 B2 | 11/2006 | Fischer et al. | |
| 7,204,412 B2 | 4/2007 | Foss, Jr. | |
| 7,255,264 B2* | 8/2007 | De Leon | 235/375 |
| 7,264,172 B2 | 9/2007 | Amiot et al. | |
| 7,882,553 B2* | 2/2011 | Tuliani | 726/9 |
| 2002/0038288 A1* | 3/2002 | Scherzer | 705/41 |
| 2002/0158747 A1* | 10/2002 | McGregor et al. | 340/5.26 |
| 2002/0180584 A1* | 12/2002 | McGregor et al. | 340/5.26 |
| 2003/0097344 A1* | 5/2003 | Chaum et al. | 705/75 |
| 2003/0132301 A1 | 7/2003 | Selker | |
| 2003/0197058 A1* | 10/2003 | Benkert et al. | 235/380 |
| 2003/0226042 A1 | 12/2003 | Fukushima | |
| 2003/0236748 A1* | 12/2003 | Gressel et al. | 705/41 |
| 2004/0030601 A1 | 2/2004 | Pond et al. | |
| 2004/0039694 A1* | 2/2004 | Dunn et al. | 705/39 |
| 2004/0049451 A1 | 3/2004 | Berardi et al. | |
| 2004/0124248 A1 | 7/2004 | Selker | |
| 2004/0185830 A1* | 9/2004 | Joao et al. | 455/410 |
| 2004/0195340 A1 | 10/2004 | Lubking | |
| 2004/0223305 A1 | 11/2004 | Amiot et al. | |
| 2004/0249753 A1* | 12/2004 | Blinn et al. | 705/41 |
| 2005/0029349 A1* | 2/2005 | McGregor et al. | 235/439 |
| 2005/0170814 A1* | 8/2005 | Joao et al. | 455/411 |
| 2005/0258245 A1* | 11/2005 | Bates et al. | 235/451 |
| 2006/0137464 A1 | 6/2006 | Baudendistel | |
| 2006/0165060 A1* | 7/2006 | Dua | 370/352 |
| 2006/0196931 A1* | 9/2006 | Holtmanns et al. | 235/380 |
| 2006/0283960 A1 | 12/2006 | Top | |
| 2007/0145135 A1* | 6/2007 | Jogand-Coulomb et al. | 235/451 |
| 2007/0152035 A1* | 7/2007 | Adams et al. | 235/380 |
| 2007/0176898 A1 | 8/2007 | Suh | |
| 2007/0262134 A1 | 11/2007 | Humphrey et al. | |
| 2007/0278317 A1 | 12/2007 | Onishi et al. | |
| 2007/0299782 A1* | 12/2007 | Beenau et al. | 705/64 |
| 2008/0011859 A1 | 1/2008 | Phillips | |
| 2008/0017704 A1* | 1/2008 | VanDeburg et al. | 235/380 |
| 2008/0035740 A1 | 2/2008 | Tanner | |
| 2008/0054078 A1 | 3/2008 | Tanner | |
| 2008/0061148 A1 | 3/2008 | Tanner | |
| 2008/0061149 A1 | 3/2008 | Tanner | |
| 2008/0061150 A1 | 3/2008 | Phillips | |
| 2008/0061151 A1 | 3/2008 | Phillips | |
| 2008/0103972 A1* | 5/2008 | Lanc | 705/44 |
| 2008/0121707 A1 | 5/2008 | Phillips et al. | |
| 2008/0154770 A1* | 6/2008 | Rutherford et al. | 705/44 |
| 2008/0165006 A1 | 7/2008 | Phillips | |
| 2008/0201577 A1* | 8/2008 | Tuliani | 713/168 |
| 2009/0065575 A1 | 3/2009 | Phillips et al. | |
| 2009/0065587 A1 | 3/2009 | Phillips | |
| 2009/0108060 A1 | 4/2009 | Phillips et al. | |
| 2009/0127332 A1* | 5/2009 | Park et al. | 235/380 |
| 2009/0166407 A1 | 7/2009 | Phillips | |
| 2009/0166408 A1 | 7/2009 | Phillips | |
| 2009/0166428 A1 | 7/2009 | Phillips et al. | |
| 2010/0163616 A1 | 7/2010 | Phillips et al. | |
| 2010/0174612 A1 | 7/2010 | Evans et al. | |
| 2010/0328029 A1 | 12/2010 | Kolek | |

OTHER PUBLICATIONS

"The Design of a Smart Card Interface Device: Chapter 5—Smart Card Protocols and ISO 7816-4", Retrieved Feb. 22, 2007. Retrieved from URL: http://www.cs.uct.ac.za/Research/DNA/SOCS/rchap5.html, 10pgs.

Jay MacDonald, "Calling Dick Tracy: Credit card watches debut", Mar. 24, 2009, Credit Cards.com, 2pgs.

Leslie Berlin, "Cellphones as Credits? Americans Must Wait", Jan. 24, 2009, The New York Times, [Retrieved Jan. 26, 2009]. Retrieved from URL: http://www.nytimes.com/2009/01/25/business/25proto.html?_r=1&em, 3pgs.

"Speedpass and Timex offer payments-by-wristwatch", Dec. 10, 2002, [Retrieved Mar. 31, 2009]. Retrieved from URL: http://www.finextra.com/fullstory.asp?id=7530, 2pgs.

"JCB pilots contactless payments", Apr. 1, 2004, [Retrieved Mar. 31, 2009]. Retrieved from URL: http://www.finextra.com/fullstory.asp?id=11549, 2pgs.

JCB delivers contactless Offica service over Casio wrist watch, Jun. 14, 2004, [Retrieved Mar. 31, 2009]. Retrieved from URL: http://www.finextra.com/fullstory.asp?id=11994, 2pgs.

"MasterCard launches OneSmart Paypass", Nov. 2, 2004, [Retrieved Mar. 31, 2009]. Retrieved from URL: http://www.finextra.com/fullstory.asp?id=12788, 2pgs.

"Visa launches contactless payments system in US", Feb. 25, 2005, [Retrieved Mar. 31, 2009]. Retrieved from URL: http://www.finextra.com/fullstory.asp?id=13291, 2pgs.

"Contact sports fans go contactless with MasterCard PayPass", Feb. 22, 2005, [Retrieved Mar. 31, 2009]. Retrieved from URL: http://www.finextra.com/fullstory.asp?id=13291, 2pgs.

Ian Rowley (in Tokyo), "$5,000? Put It on My Cell", Jun. 6, 2005, Asian Business, Business Week, [Retrieved Mar. 31, 2009]. Retrieved from URL: http://www.businessweek.com/print/magazine/content/05_23/b3936060.htm? chan=gl, 2pgs.

"Citibank to roll out MasterCard PayPass contactless keyring", Aug. 25, 2005, [Retrieved Mar. 31, 2009]. Retrieved from URL: http://www.finextra.com/fullstory.asp?id=14154, 2pgs.

Michael Fitzgerald, "Use your Cell Phone Instead of Your Credit Card", Monday, Sep. 19, 2005, PC World Communications, Inc., 2ps.

"Chinatrust releases PayPass-enabled wrist watch", Jun. 7, 2006, [Retrieved Mar. 31, 2009]. Retrieved from URL: http://www.finextra.com/fullstory.asp?id=15406, 2pgs.

"Turkey's Garanti Bank to issue PayPass wrist watch", May 8, 2007, [Retrieved Mar. 31, 2009]. Retrieved from URL: http://www.finextra.com/fullstory.asp?id=16902, 2pgs.

"Turkey gets wristwatch with built-in credit card", May 11, 2007, [Retrieved Mar. 30, 2009]. Retrieved from URL: http://www.wristdreams.com/archives/2007/05/turkey_get_wri.html, 4pgs.

"Wristwatch Equipped With a Built-In Credit Card", Thursday, May 17, 2007, [Retrieved Mar. 30, 2009]. Retrieved from URL: http://www.crookedbrains.net/2007/05/wristwatch-equipped-with-built-in.html, 4pgs.

"Wristwatch With Built-In Credit Card", Saturday, May 26th, 2007, [Retrieved Mar. 30, 2009]. Retrieved from URL: http://www.funniestgadgets.com/2007/05/26/wristwatch-with-built-in-credit-card/, 3pgs.

Karen Bruno, "Artist peddling designs for your credit card", Aug. 8, 2007, [Retrieved Mar. 31, 2009]. Retrieved from URL: http://www.creditcards.com/credit-card-news/credit-card-designs-and-covers-1273.php, 3pgs.

"Credit Card Rings (1964)", Thursday, Sep. 13, 2007, Paleo-Future, [Retrieved Mar. 30, 2009]. Retrieved from URL: http://www.paleofuture.com/blog/2007/9/14/credit-card-rings-1964.html, 5pgs.

"Altair unveils pre-paid contactless PayPass wrist watch", Jun. 27, 2008, [Retrieved Mar. 31, 2009]. Retrieved from URL: http://www.finextra.com/fullstory.asp?id=18654, 3pgs.

Wikipedia, the free encyclopedia, "EMV", retrieved date Sep. 16, 2011, download from http://en.wikipedia.org/wiki/EMV, 13pgs.

"Smart Card News Online", Jan. 11, 2008, Smart Card News Ltd (SCN), retrieved date Sep. 16, 2011, download from http://www.smartcard.co.uk/NOLARCH/2008/January/110108.html, 4pgs.

\* cited by examiner

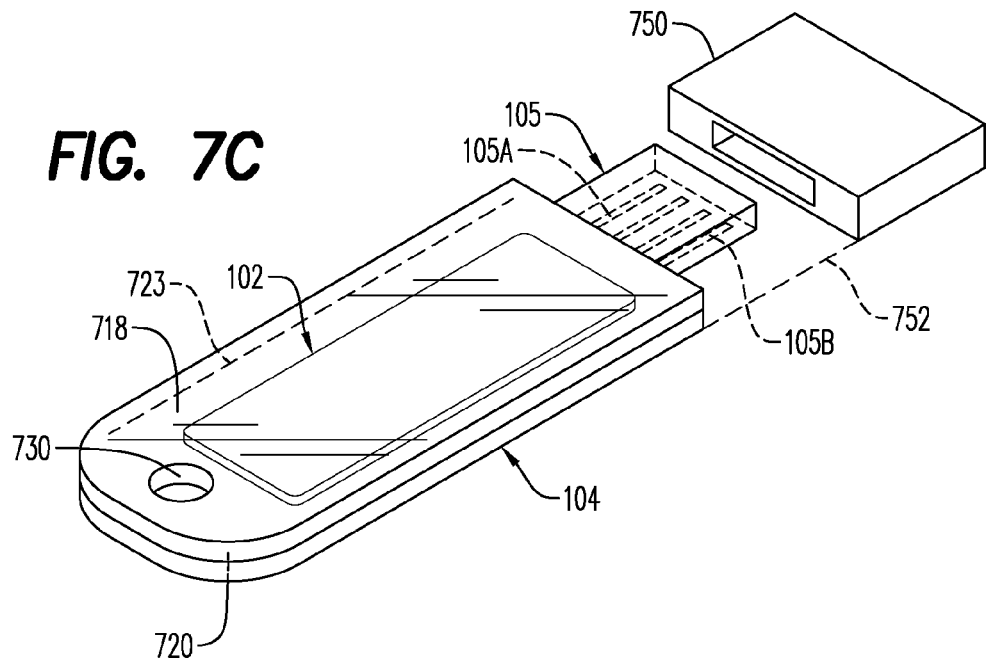
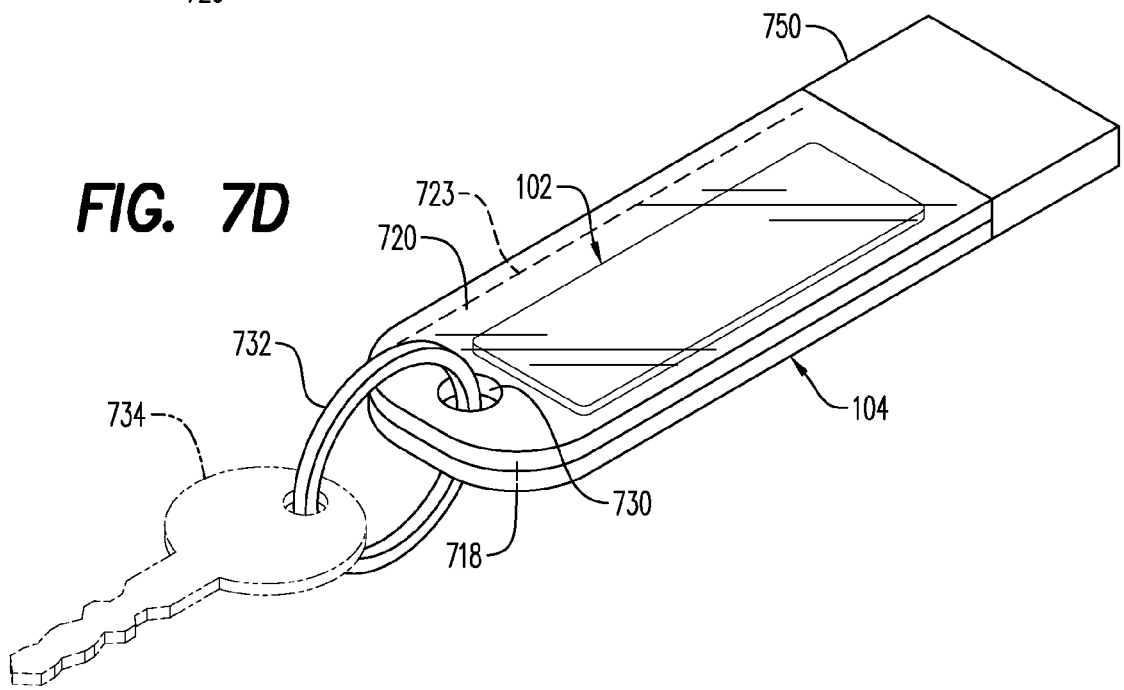
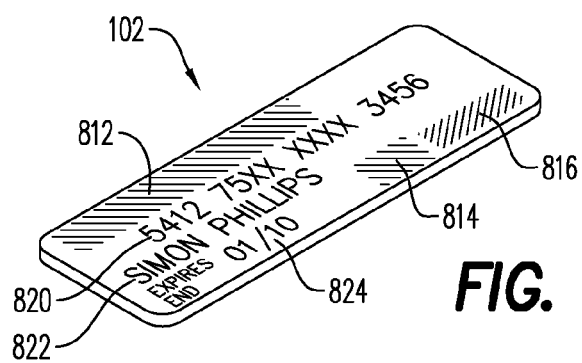

METHODS AND APPARATUS FOR USE IN ASSOCIATION WITH IDENTIFICATION TOKEN

BACKGROUND

Proximity payment devices are in widespread use. A well known standard for proximity payment devices has been promulgated by MasterCard International Incorporated, the assignee hereof, and is referred to as "PayPass". A proximity payment device often includes a wireless communication interface to transmit a payment account number and/or other information to a point of sale (POS) terminal. The wireless interface often includes a radio frequency identification integrated circuit (RFID IC) and an antenna to receive a power signal from and/or communicate with the POS terminal.

Some proximity payment devices include an EMV risk parameter that is used to help reduce and/or limit fraud and/or bad debt. The EMV risk parameter is usually incremented or decremented each time the proximity payment device is used in a purchase transaction. The proximity payment device may be usable only until the EMV risk parameter reaches a predetermined value and/or until a predetermined amount has been spent. Thereafter, the EMV risk parameter may need to be reset if the proximity payment device is to be usable in further purchase transactions.

One issue associated with EMV risk parameters is how to reset the EMV risk parameter during periods of time in which the risk of fraud and/or bad debt is low, e.g., when the proximity payment device is not lost and the account is in good standing. Some systems reset the EMV risk parameter after the proximity payment device has been used in a predetermined number of transactions. In some systems, this is carried out the next time that the proximity payment device is presented for a purchase transaction.

A reset of the EMV risk parameter may be carried out via the wireless interface of the proximity payment device if the proximity payment device is held within range of the POS system for the amount of time needed for the reset. If the proximity payment device has a card shape and contact terminals, the proximity payment device may be inserted into a card reader with contacts that make contact with the terminals on the card.

BRIEF DESCRIPTION OF THE DRAWINGS

FIGS. 7A-7D are perspective views of a proximity payment device, a body and a connector, according to some embodiments;

FIG. 8 is a schematic plan view of proximity payment device, according to some embodiments;

DETAILED DESCRIPTION

Some proximity payment devices are not supported by a card shaped body and thus may not be insertable into a card reader adapted to receive a card shaped body. It may be advantageous to be able to reset an EMV risk parameter and/or other security parameter(s) stored in such proximity payment devices without a need to hold the proximity payment device within range of the POS system for the entire amount of time needed to reset the EMV security parameter. This amount of time is sometimes twenty to thirty seconds and/or may be considerably longer than the amount of time needed for a payment transaction itself.

Some embodiments address one or more of the above concerns in whole or in part.

Figure 1:
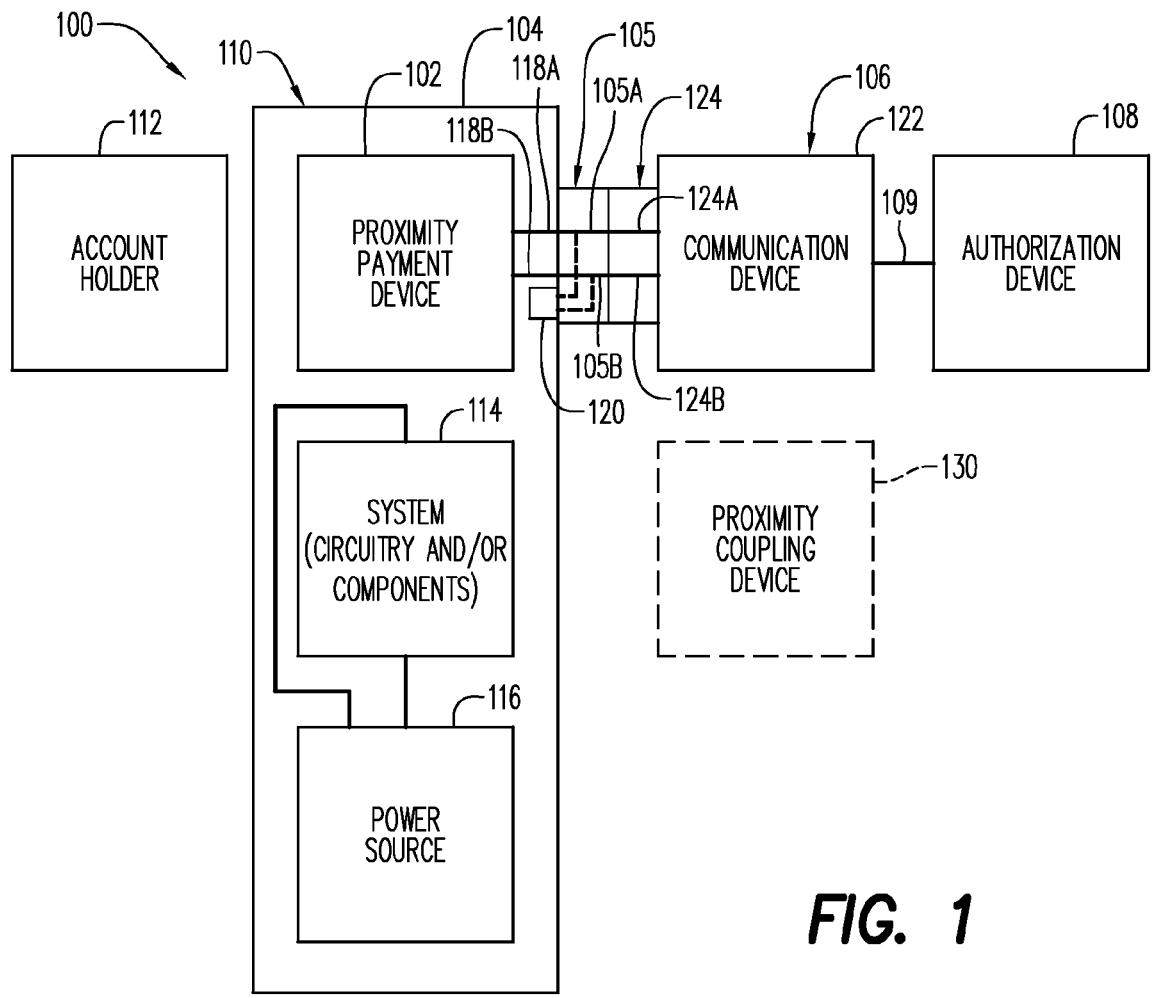
FIG. 1 is a schematic block diagram of a system, according to some embodiments.

FIG. 1 is a schematic block diagram of a system 100 to reset an EMV risk parameter and/or other security parameter(s) stored in a proximity payment device, in accordance with some embodiments. Referring to FIG. 1, in accordance with some embodiments, the system 100 includes a proximity payment device 102, a communication device 106, an authorization device 108 and a communication link 109.

The proximity payment device 102 may be supported by a body 104. Unless stated otherwise, the term "supported by" means supported by directly and/or indirectly. In some embodiments, "supported by" includes partially, and/or entirely, disposed on, disposed in, mounted on, mounted in, installed on, installed in, contained in and/or embedded in. In some embodiments, the body 104 encloses the proximity payment device 102.

The proximity payment device 102 and body 104 may comprise any type of proximity payment device and body, respectively. In some embodiments, body 104 has a card shape. In some other embodiments, body 104 does not have a card shape. In some embodiments, the body 104 comprises a body of a key fob, a wristwatch, a music player, a video player, a PDA, a USB flash drive (or other type of mass storage device) and/or any other portable device, represented by device 110. In such embodiments, the device 110 may further comprise a system 114 to perform one or more functions of the device 110. If the device 110 comprises a wristwatch, the system 114 may comprise circuitry and/or components to perform one or more functions of the wristwatch. If the device 110 comprises a music player, the system 114 may comprise circuitry and/or components to play music. If the device 110 comprises a video player, the system 114 may comprise circuitry and/or components to play video (with or without associated audio). If the device 110 comprises a PDA, the system 114 may comprise circuitry and/or components to perform one or more functions of the PDA. If the device 110 comprises a thumb drive (or other storage device), the system 114 may comprise circuitry and/or components to perform one or more functions of the thumb drive (or other storage device). Although the system 114 is shown separate from the proximity payment device 102, the proximity payment device 102 and the system 114 may share one or more circuits and/or components. The device 110 may further include a power source 116. The power source 116 may be coupled (directly and/or indirectly) and/or supply power (directly and/or indirectly) to the proximity payment device 102 and/or the system 114. In some embodiments, the power source 116 comprises a battery.

In some embodiments, the proximity payment device 102, the body 104 and/or the device 110 are issued to an account holder 112. Unless stated otherwise, the term "issued to" may include, but is not limited to, given to, loaned to, rented to, sold to, and/or transferred to. In some embodiments, issuing the proximity payment device 102, the body 104 and/or the device 110 to the account holder 112 comprises handing, sending, and/or otherwise providing the proximity payment device 102, the body 104 and/or the device 110, respectively, to the account holder 112. In some embodiments, sending comprises mailing. In some embodiments, if more than one of the proximity payment device 102, the body 104 and the device 110 are issued to an account holder 112, they need not be issued in the same manner as one another.

An electrical connector 105 may be attached to the body 104. Unless stated otherwise, the term "attached" means attached in any way, e.g., fixedly attached or removably attached, directly attached or indirectly attached, and combinations thereof.

The electrical connector 105 may comprise any type of electrical connector. In some embodiments, electrical connector 105 comprises a universal serial bus (USB) connector. In some embodiments, the electrical connector 105 comprises connector mounted to the body 104. In some embodiments, the electrical connector 105 comprises a USB connector mounted to the body 104.

In some embodiments, the electrical connector 105 includes one or more electrical conductors, represented by electrical conductors 105A-105B. The electrical conductors 105A-105B may each have a first end and a second end. In some embodiments, one or more electrical conductors, represented by electrical conductors 118A-118B, couple the first end of one or more of the electrical conductors 105A-105B, to the proximity payment device 102. In some other embodiments, circuitry and/or other components 120 to perform near field communication couple the first end of one or more of the electrical conductors 105A-105B to the proximity payment device 102. Such circuitry and/or other components 120 may comprise an NFC IC provided by PHILIPS ELECTRONICS or NXP Semiconductors. The second end of one or more of the electrical conductors 105A-105B may be electrically connected to the communication device 106. Unless stated otherwise, the term "electrically connected" means directly electrically connected or indirectly electrically connected.

The communication device 106 may comprise any type of communication device. In some embodiments, communication device 106 comprises a communication device issued to account holder 112. In some embodiments, communication device 106 comprises a personal computer.

In some embodiments, the communication device 106 includes a body 122 and an electrical connector 124. The electrical connector 124 may be attached to the body 122 and may be adapted to be mated with the electrical connector 105. In that regard, the electrical connector 124 may include one or more electrical conductors, represented by electrical conductors 124A-124B, to make contact with one or more of the electrical conductors 105A-105B, respectively, of the electrical connector 105. In some embodiments, electrical connector comprises a USB connector. Unless stated otherwise, the term "mated" means electrically connected and in physical contact.

The authorization device 108 may comprise any type of authorization device capable of providing an authorization to reset the EMV risk parameter and/or other security parameter(s) stored in the proximity payment device 102. In some embodiments the authorization device comprises a device operated by and/or on behalf of an issuer of the proximity payment device 102. In some embodiments, the authorization device 108 comprises a website. In some embodiments, the authorization device 108 comprises a website operated by and/or on behalf of an issuer of the proximity payment device 102.

The communication link 109, which couples the communication device 106 and the authorization device 108, may comprise any type of communication link, for example, but not limited to wired (e.g., conductors, fiber optic cables) or wireless (e.g., acoustic links, electromagnetic links or any combination thereof including, for example, but not limited to microwave links, satellite links, infrared links), and/or any combinations thereof. A communication link may be public or private, dedicated and/or shared (e.g., a network) and/or any combination thereof. Thus, a communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols including, for example, but not limited to the Internet Protocol. In some embodiments, the communication link 109 comprises a telephone line and/or a computer network.

As further described below, in some embodiments, the proximity payment device 102 includes an EMV risk parameter and/or other security parameter(s) and communicates with the communication device 106 via the electrical connector 105. The communication device 106 may communicate with the authorization device 108, before, after, and/or while communicating with the proximity payment device 102, to obtain authorization to reset the security parameter in the proximity payment device 102. The communication device 106 may thereafter transmit at least one signal to the proximity payment device 102 to indicate authorization to reset the security parameter. The proximity payment device 102 may receive the at least one signal transmitted by the communication device 106 and may reset the security parameter in response, at least in part, thereto.

Unless stated otherwise, communication may be direct and/or indirect, one way and/or two way. Thus, the phrase "the proximity payment device 102 communicates with the communication device 106 via the electrical connector 105" means that, in some embodiments, the proximity payment device 102 transmits at least one signal to the communication device 106 via a communication link that includes the electrical connector 105 and/or receives at least one signal from the communication device 106 via a communication link that includes the electrical connector 105. In view thereof, the at least one signal from the communication device 106 may comprise a signal directly from (e.g., actually transmitted by)

the communication device 106 and/or a signal indirectly from (e.g., representing the same information as a signal actually transmitted by) the communication device 106.

A proximity coupling device 130 is also shown in FIG. 1. Proximity coupling device 130 may comprise a proximity coupling device of a POS terminal. In some embodiments, the proximity payment device 102 may be presented to the proximity coupling device 130 to accomplish payment for a transaction.

Figure 2:
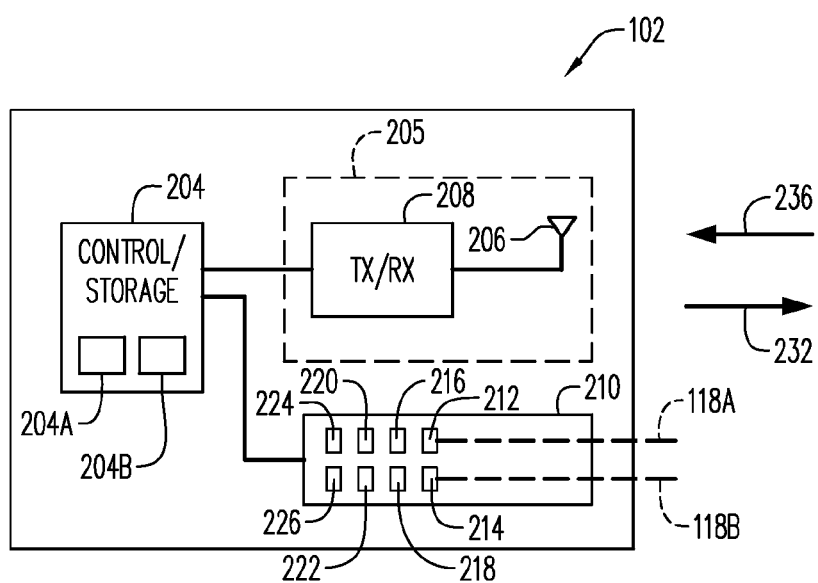
FIG. 2 is a schematic block diagram of a proximity payment device, according to some embodiments.

FIG. 2 is a schematic block diagram of the proximity payment device 102, according to some embodiments. Referring to FIG. 2, in accordance with some embodiments, the proximity payment device 102 includes control/storage circuitry 204 and a wireless communication interface 205.

As used herein, the control storage circuitry 204 may comprise any type of control/storage circuitry. For example, control/storage circuitry may be programmable or non programmable, general purpose or special purpose, dedicated or non dedicated, distributed or non distributed, shared or not shared, and/or any combination thereof. Control/storage circuitry may include, but is not limited to, hardware, software, firmware, and/or any combination thereof. Hardware may include, but is not limited to off the shelf integrated circuits, custom integrated circuits and/or any combination thereof. In some embodiments, control/storage circuitry comprises a microcontroller, which may in turn comprise a microprocessor. Software may include, but is not limited to, instructions that are storable and/or stored on a computer readable medium, such as, for example, punch cards, paper tape, magnetic or optical disk, magnetic or optical tape, CD-ROM, DVD, RAM, EPROM, or ROM. Control/storage circuitry may employ continuous signals, periodically sampled signals, and/or any combination thereof. If control/storage circuitry is distributed, two or more portions of the control/storage circuitry may communicate with one another through a communication link.

In some embodiments, the control/storage circuitry 204 comprises a simple memory device capable only of responding to a pre-defined set of commands. In some other embodiments, the control/storage circuitry 204 comprises a secure microcontroller capable of executing a pre-defined program.

In some embodiments, the control/storage circuitry 204 stores information, collectively represented at 204A, which may include a payment account number, a name of a person (which may be an account holder 112) and/or other information that may be transmitted to a POS terminal. The control/storage 204 may also store security information, collectively represented at 204B, which may include an EMV risk parameter and/or other security parameter(s).

The wireless communication interface 205 allows the proximity payment device 102 to transmit and/or receive signals. The signals transmitted by the wireless communication interface 205 may include a payment account number and/or other information stored in the control/storage circuitry 204. The signals received by the wireless communication interface may include an interrogation signal, a power signal and/or other signals.

In some embodiments, a signal may comprise an information signal, a power signal and/or a combination thereof. An information signal may represent any type of information, for example but not limited to data, instruction, command, control, timing, synchronization, request, query, interrogation, authorization and/or any other type of information.

In some embodiments, wireless communication interface 205 comprises an antenna 206 and transmit/receive circuitry 208. The antenna 206 may be configured to transmit and receive radio frequency (RF) signals and may comprise a loop antenna and/or any other suitable configuration. The transmit/receive circuitry 208 may be coupled between the antenna 206 and the control/storage circuitry 204.

In operation, wireless signals (e.g., RF signals) may be received by the antenna 206 and supplied to the transmit/receive circuitry 208, which in response may provide signals that are supplied to the control/storage circuitry 204. The control/storage circuitry 204 may also provide signals that are supplied to the transmit/receive circuitry 208, which in response may provide signals that are supplied to the antenna 206 and transmitted thereby.

In some embodiments, the control/storage circuit 204 and the transmit/receive circuitry 208 are disposed in a single integrated circuit. In some embodiments, the control/storage circuitry 204 and the transmit/receive circuitry 208 are disposed in an RFID IC. Unless stated otherwise, the term RFID is not limited to a specific type of RFID. In some embodiments, an RFID may be a simple memory device capable only of responding to a pre-defined set of commands. In some other embodiments, an RFID may comprise a microcontroller capable of executing a program. In some embodiments, an RFID IC comprises an IC that uses contactless technology, such as, for example, as specified in international standard ISO/IEC 14443. Some embodiments may include additional features and/or other configurations altogether.

The proximity payment device 102 may further include a contact interface 210. The contact interface 210 may include a plurality of contacts, represented by contacts 212-228. In some embodiments, the contact interface 210 is the same as and/or similar to a contact interface of a conventional smart card having a contact interface.

As stated above, the proximity payment device 102 may be coupled to the electrical connector 105 to allow the proximity device 102 to transmit signals and/or to receive signals via the electrical connector 105. In that regard, in some embodiments, the one or more conductors 118A-118B electrically connect one or more of the contacts 212-218 to the first end of one or more of the electrical conductors 105A-105B of the electrical connector 105, to allow the proximity device 102 to transmit signals and/or to receive signals via the electrical connector 105. In some other embodiments, the circuitry and/or other components 120 to perform near field communication couple may couple the wireless communication interface 205 to the first end of one or more of the electrical conductors 105A-105B of the electrical connector 105, to allow the proximity device 102 to transmit signals and/or to receive signals via the electrical connector 105.

Signals transmitted by the proximity payment device 102 (e.g., via the wireless interface 205 and/or the contact interface 210) are represented at 232. Signals received by the proximity payment device 102 (e.g., via the wireless interface 205 and/or the contact interface 210) are represented at 236.

Figure 3:
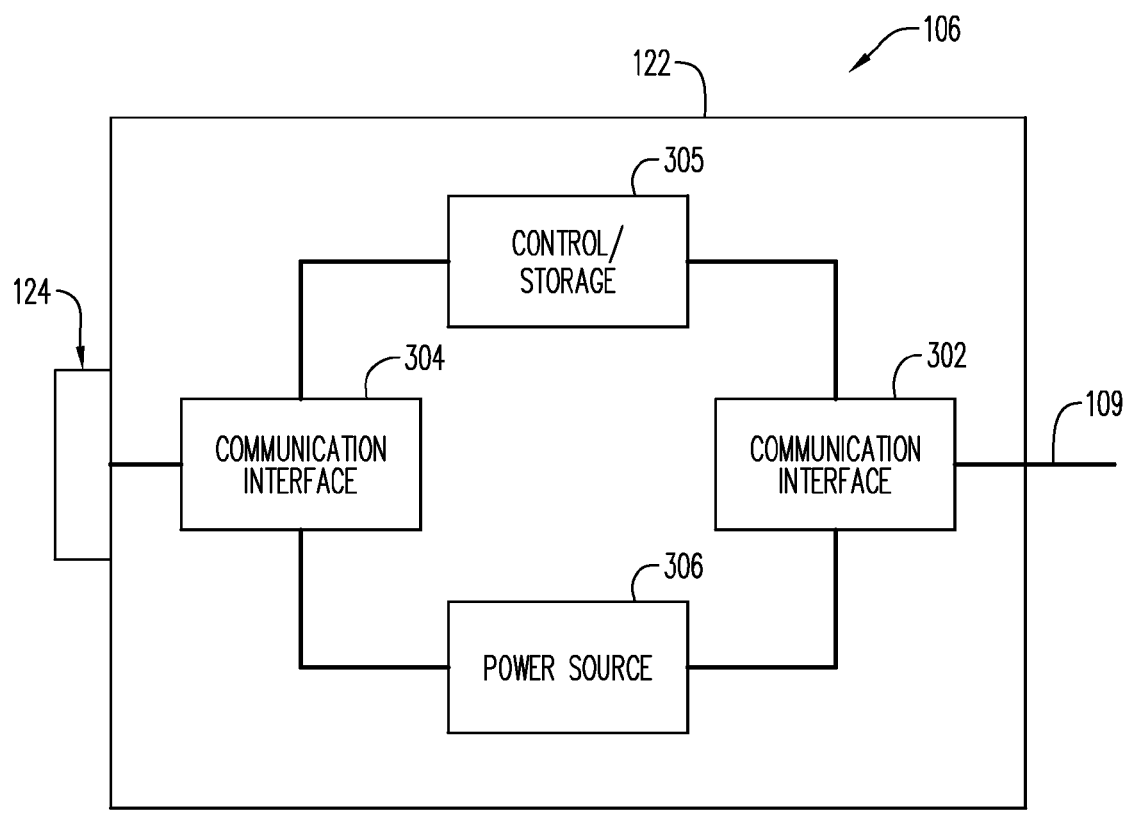
FIG. 3 is a schematic block diagram of a communication device, according to some embodiments.

FIG. 3 is a schematic block diagram of communication device 106, in accordance with some embodiments. Referring to FIG. 3, in accordance with some embodiments, the communication device 106 may further include a first communication interface 302, a second communication interface 304 and control/storage circuitry 305. The first communication interface 302 may be coupled to the electrical connector 124. The second communication interface 304 may be coupled to the authorization device 108 (FIG. 1).

In operation, signals may be received by the communication interfaces 302, 304 and supplied to the control/storage circuitry 305. The control/storage circuitry 305 may also provide signals that are supplied to the communication interfaces 302, 304.

The communication device 106 may further include a power source 306. The power source 306 may be coupled (directly and/or indirectly) and/or supply power (directly and/or indirectly) to the first communication interface 302 and/or the second communication interface 304. In some embodiments, the power source 306 comprises a battery.

Figure 4A:
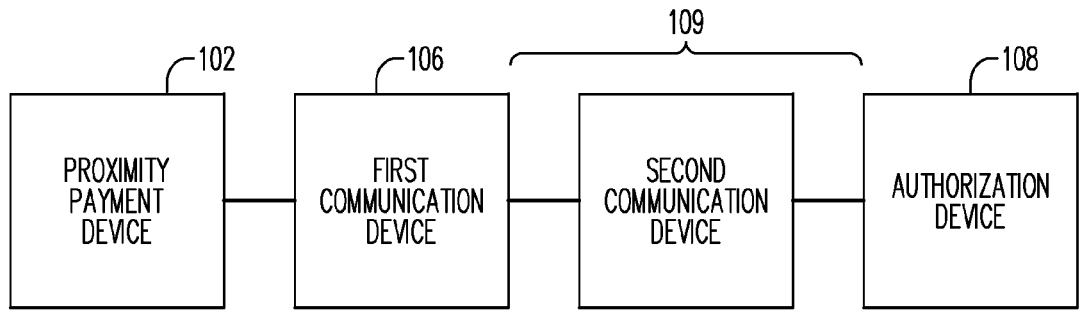
FIG. 4A is a schematic block diagram of a system, according to some embodiments.

FIG. 4A is a schematic block diagram of the system 100, in accordance with some embodiments. Referring to FIG. 4A, in accordance with some embodiments, the communication device 106 comprises a first communication device and the communication link 109 comprises a second communication device.

Figure 4B:
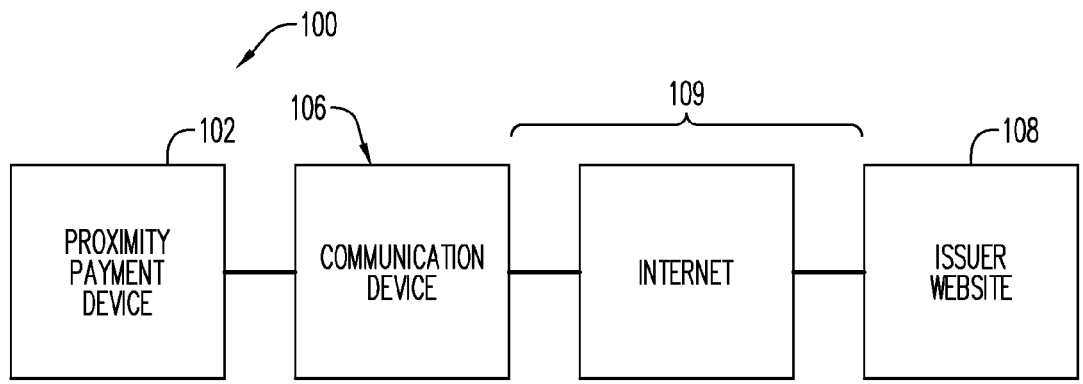
FIG. 4B is a schematic block diagram of a system, according to some embodiments.

FIG. 4B is a schematic block diagram of the system 100, in accordance with some embodiments. Referring to FIG. 4B, in accordance with some embodiments, the communication link 109 comprises the Internet and/or other computer network. In some embodiments the communication link 109 comprises the Banknet. In some embodiments, the authorization device 108 comprises an issuer website.

Figure 4C:
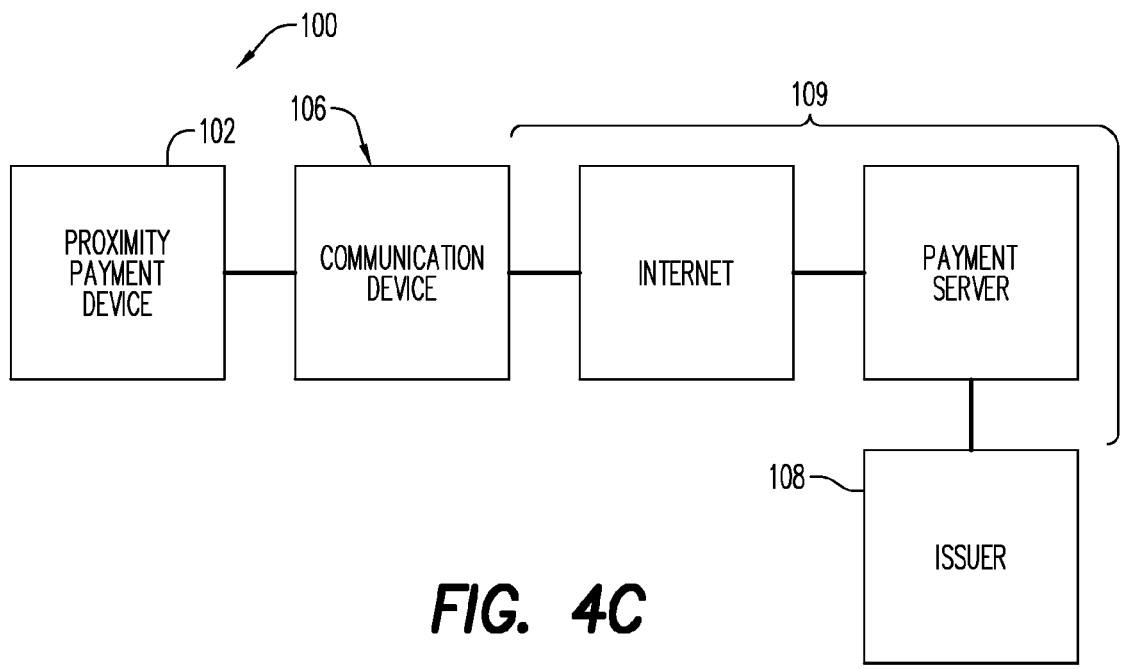
FIG. 4C is a schematic block diagram of a system, according to some embodiments.

FIG. 4C is a schematic block diagram of a system 100, in accordance with some embodiments. Referring to FIG. 4C, in accordance with some embodiments, the communication link 109 comprises the Internet (and/or other computer network) and a payment server. As stated above, in some embodiments, the authorization device 108 comprises an issuer device.

Figure 5:
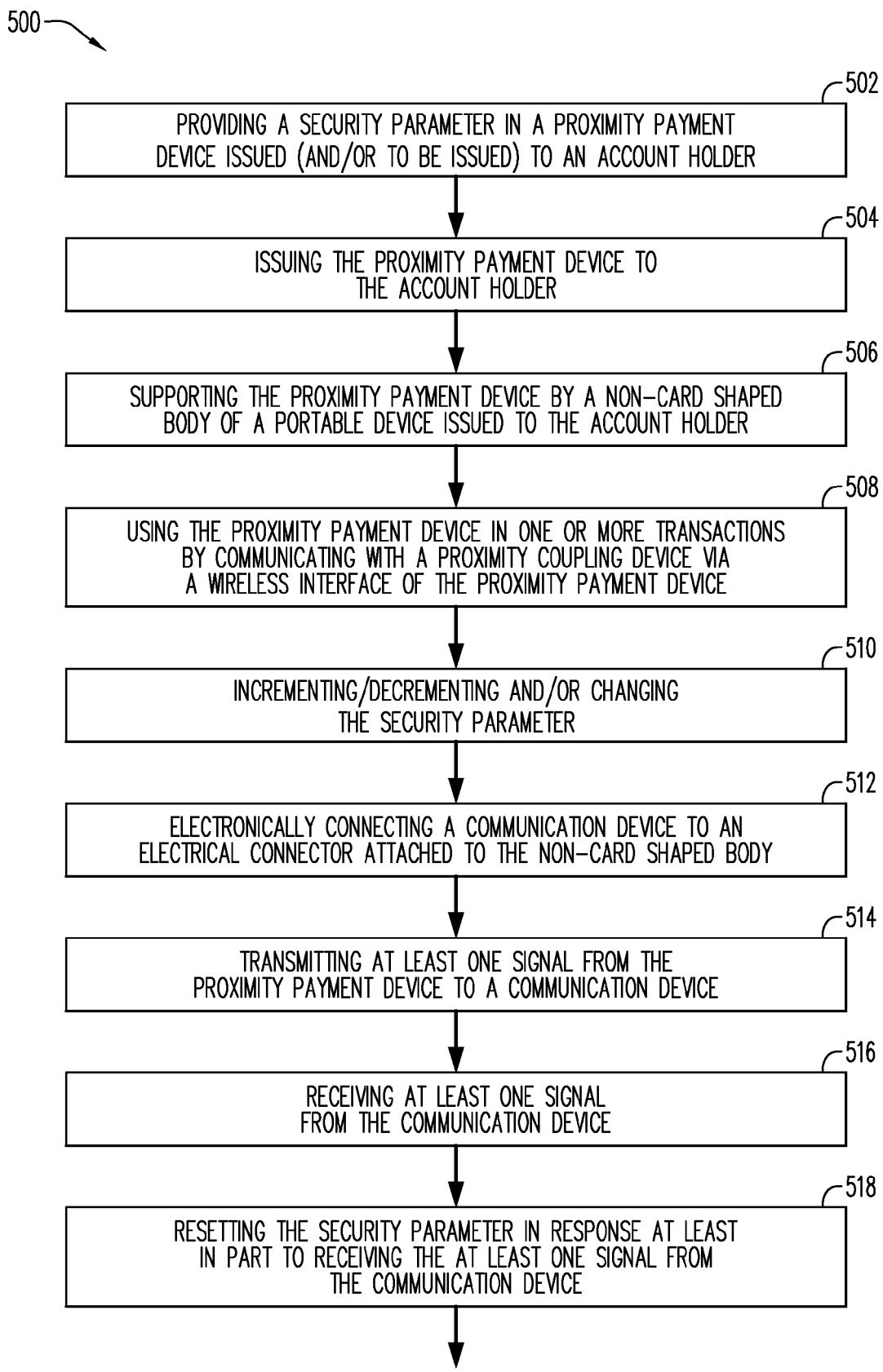
FIG. 5 is a flow chart that illustrates a method, according to some embodiments.

FIG. 5 is a flow chart 500 of a method according to some embodiments. In some embodiments, one or more portions of the method may be used in association with the proximity payment device 102, the electrical connector, the communication device 106 and/or one or more other portions of the system 100 (FIG. 1). The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 502, the method may include providing a security parameter in a proximity payment device issued, and/or to be issued, to an account holder. In some embodiments such security parameter comprises an EMV risk parameter that is provided in the course of personalization and/or a pre-personalization of the proximity payment device. As is known, pre-personalization of the proximity payment device may include storing information such as keys to be used in subsequent transactions and/or parameters to be used to select a particular card brand to be borne by the proximity payment device. This may include writing information such as loading of keys to be used in subsequent transactions and parameters (such as to select a particular card brand to be borne by the proximity payment device) into the control/storage circuitry 204 (FIG. 2) of the proximity payment device. Pre-personalization may further include printing information such as a payment card association brand, etc., on the proximity payment device. If a multiple proximity payment devices are processed as a batch, the information transmitted to each proximity payment device and/or printed on each proximity payment device may be the same for all proximity payment devices in the batch.

Personalization of the proximity payment device may include assigning the proximity payment device to a particular payment account and/or a particular account holder by storing information in the proximity payment device. This may include writing a payment card account number and a name of the account holder into the control/storage circuitry 204 (FIG. 2) of a proximity payment device. Other information, such as expiration date, may be stored in either of the pre-personalization and personalization steps. Personalization may further include printing the payment account number and/or any other information (or a portion thereof) that was (or is to be) stored in the proximity payment device 102 on a surface of the proximity payment device 102. In some embodiments, pre-personalization and personalization steps may be combined into one step. In some embodiments, personalization and/or pre-personalization is carried out using contactless card programming equipment commonly used to program proximity payment cards, such as for example, a model 9000 available from Datacard Group, Minnetonka, Minn.

At 504, the method may further include issuing the proximity payment device to the account holder. Unless stated otherwise, the term "issuing" may include, but is not limited to, giving, loaning, renting, selling and/or transferring. In some embodiments, issuing the proximity payment device to the account holder includes mailing and/or otherwise sending the proximity payment device to the account holder.

At 506, the method may further include supporting the proximity payment device by a non-card shaped body of a device issued to the account holder. In some embodiments, the device comprises a cell phone, a music player, a video player, a PDA, a wristwatch, a wristband, a bracelet, a pendant, a key fob and/or any other type of portable device. In some embodiments, this is carried out by the account holder, after the proximity payment device is issued to the account holder.

At 508, the method may further include using the proximity payment device in one or more transactions. This may include communicating with a proximity coupling device via a wireless interface of the proximity payment device. In some embodiments, this is carried out in a conventional manner, e.g., in accordance with the above-mentioned "PayPass" standard. For example, the proximity payment device may be presented to a proximity coupling device 130 (FIG. 1) of a POS terminal to accomplish payment for a transaction. The proximity coupling device may transmit an interrogation signal. The proximity payment device may receive the interrogation signal via the antenna 206 (FIG. 2). The received interrogation signal may cause the circuitry of the proximity payment device to be powered-up. For example, the proximity payment device may include circuitry to rectify the received interrogation signal to generate a DC power that may be used to power the control/storage circuitry 204 (FIG. 2) and transmit/receive circuitry 208 (FIG. 2). The proximity payment device may transmit a signal to the proximity coupling device in response to the interrogation signal. The proximity payment device may transmit the signal (and possibly one or more additional signals) to the proximity coupling device via the antenna 206 (FIG. 2). One or more signals transmitted by the proximity payment device may include a payment card account number and/or other information required for interaction with the proximity coupling device. In some embodiments, the proximity payment device may transmit the payment card account number and/or other information via the antenna 206 (FIG. 2) after a handshake procedure or the like with the POS terminal. The POS terminal may then interact with a payment card system to charge the current sales transaction to the payment card account represented by the payment card account number received from the proximity payment device.

In some embodiments, the proximity payment device may be presented to the proximity coupling device by simply positioning the proximity payment device within wireless communication range of the proximity coupling device. In some embodiments, the proximity payment device may be presented to the proximity payment device by positioning the proximity payment device in physical contact with, and/or by tapping a portion of the proximity payment device on, the proximity coupling device.

In some embodiments, a proximity payment device may be selectively enabled/disabled in order to enable and/or disable operation of the proximity payment device. In some embodiments, a proximity payment device may be presented to a proximity coupling device before, during and/or after enabling operation of the proximity payment device.

At 510, the value of the EMV risk parameter may be incremented, decremented and/or changed in any other way in response to one or more of such transactions.

At 512, the method may include electrically connecting a communication device to an electrical connector attached to the non-card shaped body. In some embodiments, the communication device includes a body and an electrical connector attached thereto. In some embodiments, the electrical connector attached to the non-card shaped body is mated to the electrical connector attached to the body of the communication device.

At 514, the method may further include transmitting at least one signal from the proximity payment device to the communication device. In some embodiments, the at least one signal is transmitted via the electrical connector attached to the non-card shaped body. In some embodiments, the at least one signal may include a request for authorization to reset the EMV risk parameter. In some embodiments, the communication device may transmit the request to an authorization device.

At 516, the method may further include receiving at least one signal from the communication device. In some embodiments, the at least one signal is received via the electrical connector attached to the non-card shaped body. In some embodiments, the at least one signal may include authorization to reset the EMV risk parameter. In some embodiments, the communication device may receive the authorization from the authorization device.

At 518, the method may further include resetting a security parameter in the proximity payment device in response at least in part to receiving the at least one signal from the communication device. Notably, the parameter may or may not be reset to its initial value and/or attribute. Moreover, in some embodiments, an EMV risk parameter and/or other security parameter may be reset before the proximity payment device becomes unusable.

In some embodiments, the system 100 may be used to further communicate other information. In some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

Figure 6:
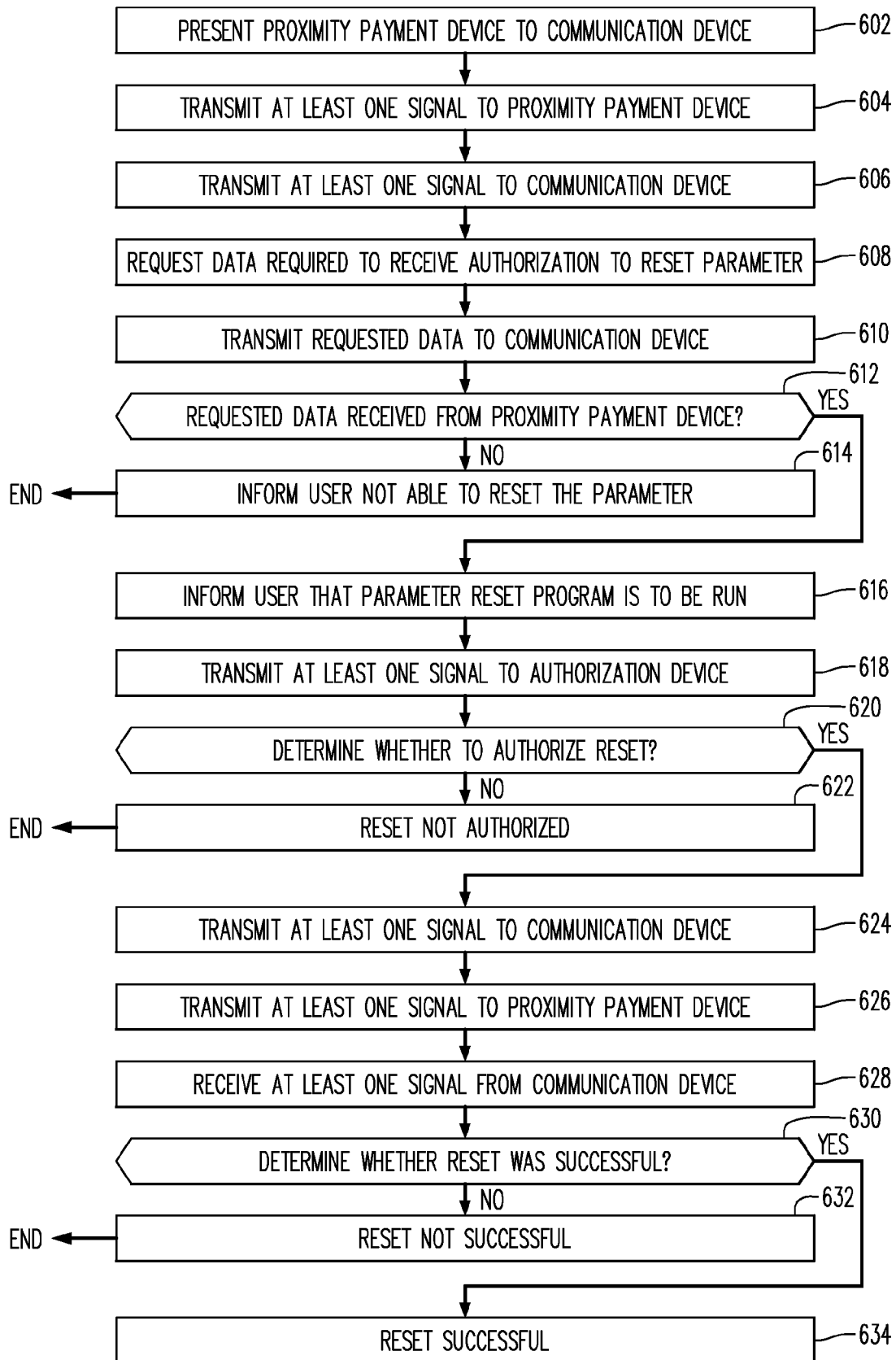
FIG. 6 is a flow chart that illustrates a method, according to some embodiments.

FIG. 6 shows a flow chart 600 of a method that may be used in resetting a EMV risk parameter, according to some embodiments. In some embodiments, one or more portions the method may be used in association with the proximity payment device 102, the electrical connector 105, the communication device 106 and/or one or more other portions of the system 100 (FIG. 1) in order to reset the EMV risk parameter stored in the proximity payment device 102. In some embodiments, one or more portions of the method may be used at 510-518 in the method of FIG. 5. The method is not limited to the order shown in the flow chart. Rather, embodiments of the method may be performed in any order that is practicable. For that matter, unless stated otherwise, any method disclosed herein may be performed in any order that is practicable. Notably, some embodiments may employ one or more portions of the method without one or more other portions of the method.

At 602, the method may include electrically connecting a proximity payment device to a communication device via an electrical connector. The communication device may recognize the proximity payment device, and at 604, the communication device may transmit at least one signal to the proximity payment device. In some embodiments, the at least one signal is transmitted via the electrical connector. In some embodiments, the at least one signal includes a query as to a status of the EMV risk parameter in the proximity payment device.

The proximity payment device may receive the at least one signal transmitted by the communication device. In some embodiments, the at least one signal is received via the electrical connector 105 (FIG. 1). The at least one signal may include at least one signal that causes the proximity payment device to be powered-up.

At 606, the proximity payment device may transmit at least one signal to the communication device. In some embodiments, the proximity payment device transmits the at least one signal via the electrical connector. The at least one signal may comprise a request for authorization to reset the EMV risk parameter. In some embodiments, the at least one signal transmitted by the communication device includes a query and the proximity payment device transmits the request for authorization in response, at least in part, to such query. In some other embodiments, the proximity payment device transmits the at least one signal without receiving any signals from the communication device.

The communication device may receive the at least one signal transmitted by the proximity payment device. In some embodiments, the communication device receives the at least one signal via the electrical connector. If the at least one signal comprises a request for authorization to reset the EMV risk parameter, then at 608, the communication device may request an account number and/or other data that may be required to receive authorization to reset the EMV risk parameter.

The proximity payment device may receive the request for data. In some embodiments, the proximity payment device receives the request for data via the electrical connector.

At 610, the proximity payment device may transmit the requested data to the communication device. In some embodiments, the proximity payment device transmits the data via the electrical connector.

The communication device may receive the data transmitted by the proximity payment device. In some embodiments, the communication device receives the data via the electrical connector.

At 612, the communication device may determine whether the data includes the requested data. If the communication device determines that the data does not include the requested data, then at 614, the communication device may inform a user that the EMV risk parameter is not able to be reset. In some embodiments, the communication device includes a display and informs and/or prompts the user using the display.

In some embodiments, information supplied to and/or by the display comprises information supplied by the proximity payment device. In some embodiments, the proximity payment device supplies the information via the electrical connector.

In some embodiments, information supplied to and/or by the display may define one or more logos and/or brands. In some embodiment, the one or more logos and/or brands may include (i) a brand and/or logo of a national payment card association such as MasterCard International Incorporated, (ii) a brand and/or logo of an issuer and/or merchant associated with the proximity payment device (iii) a brand and/or logo of a specific card product.

At 612, if the communication device determines that the data includes the requested data, then at 616, the communication device may inform the user that an EMV risk parameter reset program is to be run.

At 618, the communication device may transmit at least one signal to an authorization device. In some embodiments, the at least one signal comprises a request for authorization to reset the EMV risk parameter and/or data that may be required to receive such authorization. In some embodiments, the authorization device comprises a device operated by the issuer and/or a device operated by a party associated with the issuer.

In some embodiments, the method includes establishing a communication channel to connect the communication device and the authorization device. In some embodiments, the method includes establishing a communication channel to connect the proximity payment device and the authorization device.

If the communication device comprises a cell phone, the proximity payment device may transmit the at least one signal via a communication link that includes the cellular network. If the communication device comprises a computer, the communication device may transmit the at least one signal via a communication link that includes a telephone line and/or a network, e.g., the Internet.

The authorization device may receive the at least one signal transmitted by the communication device, and at 620, the authorization device may determine whether to authorize reset of the EMV risk parameter. In some embodiments, this determination is based on whether or not risk of fraud and/or bad debt is low, e.g., the proximity payment device is not reported lost and the account is in good standing.

If the authorization device determines not to authorize reset of the EMV risk parameter, then at 622, the authorization device may inform the communication device, which may in turn inform the user that the EMV risk parameter is not authorized to be reset.

At 620, if the authorization device determines to authorize reset of the EMV risk parameter, then at 624, the authorization device may transmit at least one signal to the communication device. In some embodiments, the at least one signal includes an authorization to reset the EMV risk parameter. In some embodiments, the authorization comprises a script to be executed by the proximity payment device to reset the EMV risk parameter.

The communication device may receive the at least one signal transmitted by the authorization device, and at 626, the communication device may transmit the at least one signal to the proximity payment device. In some embodiments, the at least one signal is transmitted via the electrical connector.

At 628, the proximity payment device may receive the at least one signal transmitted by the communication device. In some embodiments, the at least one signal is received via the electrical connector.

If the at least one signal includes an authorization to reset the EMV risk parameter, the proximity payment device may reset the EMV risk parameter in response at least thereto. If the at least one signal includes a script, the proximity payment device may execute the script to reset the EMV risk parameter.

At 630, the communication device and/or the proximity payment device may determine whether the reset was successful. If the reset was not successful, then at 632, the communication device may inform the user and/or the authorization device that the reset was not successful. In some embodiments, the communication device informs the user that the reset was unsuccessful by displaying information to indicate that the reset was unsuccessful and/or by providing any other type of human detectable indication that the reset was unsuccessful. In some embodiments, the human detectable indication comprises a visible, audible and/or tactile indication. In some embodiments, such visible indication may comprise text and/or predefined visible indication(s) to indicate that the reset was unsuccessful. In some embodiments, such audible indication may comprise machine generated speech and/or predefined sound(s) to indicate that the reset was unsuccessful. In some embodiments, such tactile indication may comprise a vibration and/or other predefined tactile indication(s) to indicate that the reset was unsuccessful.

At 630, if the reset was successful, then at 634, the communication device may inform the user and/or the authorization device that the reset was successful. In some embodiments, the communication device informs the user that the reset was successful by displaying information to indicate that the reset was successful and/or by providing any other type of human detectable indication that the reset was successful. In some embodiments, the human detectable indication comprises a visible, audible and/or tactile indication. In some embodiments, such visible indication may comprise text and/or predefined visible indication(s) to indicate that the reset was successful. In some embodiments, such audible indication may comprise machine generated speech and/or predefined sound(s) to indicate that the reset was successful. In some embodiments, such tactile indication may comprise a vibration and/or other predefined tactile indication(s) to indicate that the reset was successful.

In some embodiments, the communication device may be used in resetting the EMV risk parameter in any number of proximity payment devices on any number of occasions. In some embodiments, the communication device may be used in resetting the EMV risk parameter in only a limited number of proximity payment devices and/or on only a limited number of occasions.

In some embodiments, the communication device may include a counter indicative of the number of occasions that the communication device may be used in resetting the EMV risk parameters. The counter may be decremented each time that the communication device is used in resetting an EMV risk parameter. If the counter reaches zero, the communication device may no longer be used in resetting an EMV risk parameter. Some embodiments may allow the issuer to reset or increment the counter so that the communication device may again be used in resetting an EMV risk parameter.

In some embodiments, one or more authentication protocols may be used in addition to and/or in lieu of the one or more portions of the methods disclosed herein.

In some embodiments, the authorization device may transmit a request for a user identifier prior to transmitting an authorization to reset the EMV risk parameter. In accordance with some embodiments, a user identifier may be required if an online purchase transaction is attempted. In some embodiments, the communication device may receive the request for the user identifier and may prompt the user to enter a user identifier (e.g., using a keypad). In accordance with some embodiments, a visible and/or audible indication may be provided to indicate that the attention of the user is required.

If the user enters a user identifier, the communication device may transmit the user identifier to the authorization device. The authorization device may determine whether the user identifier is valid. If the authorization device determines that the user identifier is not valid, the authorization device may inform the communication device of such, and the communication device may inform the user. The user may be given one or more additional opportunities to enter a user identifier, however, the authorization device may not transmit the authorization to reset the EMV risk parameter unless a valid user identifier is received.

In some embodiments, the communication device may store any data that may be required to receive authorization to reset the EMV risk parameter. In some embodiments, such data comprises the data received at 612 of the method of FIG. 6. The communication device may thereafter request authorization to reset an EMV risk parameter even though the proximity payment device may not be present. The communication device may thereafter receive authorization to reset the EMV risk parameter, which the communication device may transmit to the proximity payment device when the proximity payment device is next presented to the communication device. In some embodiments, the authorization may expire if not transmitted to the proximity payment device within a certain period of time, which may be specified by the authorization device at the time that the authorization is transmitted to the communication device. In some embodiments, this is carried out by performing portions 602-604 of the method of FIG. 6 after portion 624 and without performing portions 606-614.

Thus, in some embodiments, it is possible to reset the EMV risk parameter in a proximity payment device without having to provide a communication channel between the communication device and the authorization device. Notably such a communication channel may not always be available and/or may be inconvenient to provide and/or wait for.

In addition, in some embodiments, it is possible to reset the EMV risk parameter in a proximity payment device without having to hold the proximity payment device within range of the POS system for the amount of time needed to reset the EMV security parameter.

In some embodiments, the communication device may request authorization on a periodic basis, shortly before an authorization expires and/or after an authorization expires, so as to have an authorization available when the proximity payment device is next presented to the communication device.

In some embodiments, the communication device 106 includes information that defines a schedule for requesting authorization. In some embodiments, one or more portions of the information that defines the schedule may be supplied by and/or based at least in part on data supplied by the account holder.

In some embodiments, an account holder may connect the proximity payment device to the communication device on a periodic basis. In some embodiments, an account holder may connect the proximity payment device to the communication device at night.

In some embodiments, the proximity payment device 102, the communication device 106 and/or the authorization device 108 may transmit and/or receive signals that include data not related to resetting a security parameter in the proximity payment device. In some embodiments, such signals may be transmitted and/or received to and/or from one another and/or one or more other devices.

In some embodiments, the communication device 106 may include information that defines the data to be transmitted and/or received and/or a schedule for transmitting and/or receiving such data. The communication device 106 may also include information that defines one or more sources and/or destinations for such data. In some embodiments, one or more portions of such information may be supplied by and/or based at least in part on data supplied by the account holder.

In some embodiments, the authorization device comprises a device that is operated by and/or on behalf of an issuer of the proximity payment device. In some embodiments, the authorization device comprises a device operated by and/or on behalf of a party associated with the issuer of the proximity payment device.

In some embodiments, the communication device 106 comprises a first communication device issued to an account holder and the communication link 109 comprises a second communication device issued to the account holder.

In some embodiments, the proximity payment device 102 includes a display and/or other output device(s) and any indication described herein and/or that may be provided by the communication device, may be provided by the proximity payment device 102 in lieu of, or in addition to, being provided by the communication device.

Likewise, in some embodiments, the device 110 includes a display and/or other output device(s) and any indication described herein and/or that may be provided by the communication device, may be provided by the proximity payment device 110 in lieu of or in addition to being provided by the communication device. In some embodiments, the display and/or output device(s) is part of the system 114.

Thus, in some embodiments, if the reset was unsuccessful, the proximity payment device 102, the communication device 106 and/or the device 110 may provide a human detectable indication that the reset was unsuccessful. As stated above, in some embodiments, the human detectable indication comprises a visible, audible and/or tactile indication. If the reset was successful, the proximity payment device 102, the communication device 106 and/or the device 110 may provide a human detectable indication that the reset was successful. As stated above, in some embodiments, the human detectable indication comprises a visible, audible and/or tactile indication. As stated above, in some embodiments, the body 104 comprises a body of a keyfob.

Figure 7A:
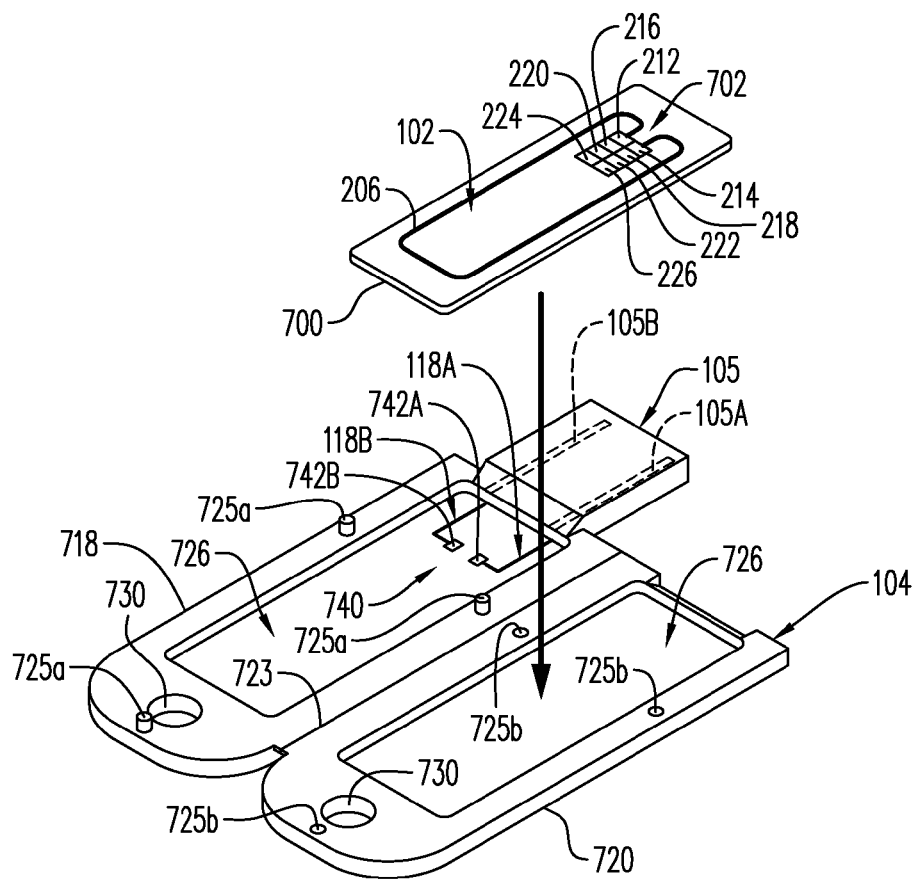
Figure 7B:
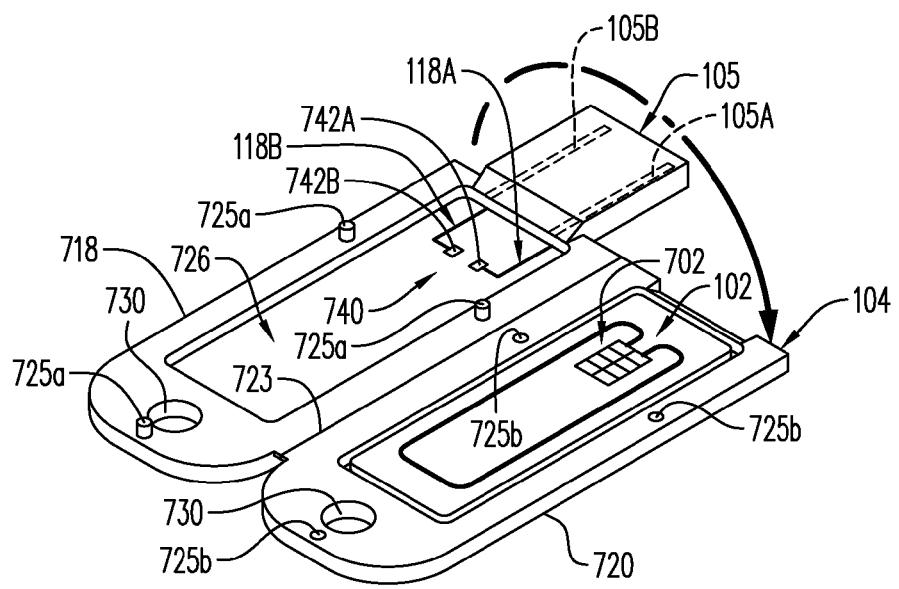

FIGS. 7A-7D are perspective views of the proximity payment device 102, the body 104 and connector 105, according to some embodiments, in which the body 104 may comprise the body of a keyfob. More particularly, FIG. 7A is a perspective view of the proximity payment device 102, the body 104 and connector 105, according to some embodiments, with the body 104 in an open state, prior to installing the proximity payment device 102 therein. FIG. 7B is a perspective view of the proximity payment device 102 installed in the body 104, according to some embodiments, with the body 104 in an open state. FIGS. 7C-7D are perspective views of the proximity payment device 102 installed in the body 104, according to some embodiments, with the body 104 in a closed state.

Referring to FIGS. 7A-7D, in accordance with some embodiments, the proximity payment device 102 may include a generally rectangular card-shaped plastic body 700 and an RFID IC 702 supported thereby. The generally rectangular card-shaped plastic body 700 may have a height dimension of about 54 mm, a width dimension of about 18 mm, and a thickness dimension of about 0.76 mm. The RFID IC 702 may include the control/storage circuit 204, the transmit/receive circuitry 208 and the contact interface 210. The contact interface 210 may include contacts 212-226. Two of the contacts 212-226, e.g., contacts 212, 214, may be electrically connected to the antenna 206.

As further described below, the proximity payment device 102 may further include information printed and/or otherwise provided thereon. For example, in some embodiments, the payment account number (or a portion thereof), the account holder's name, a valid from date, an expiration date, a security code and/or other information may be printed and/or otherwise provided on the proximity payment device 102. If only a portion of the payment account number is provided, such portion may include any number of characters disposed at any position(s) of the account number. In some embodiments, the portion of the payment card account number may include six digits at the beginning of the account number and/or six digits at the end of the account number. If the payment card account number has a BIN portion, the six digits at the beginning of the account number may correspond to such BIN portion. A placeholder may be provided in place of any portion or portions of the payment card account number that are not printed. In some embodiments, one or more X's, (and/or other character(s)) and/or one or more blank spaces may be used as a placeholder for any portions of the payment card account number that are not provided. In some embodiments, an X may be printed in place of each omitted character of the payment card account number. In some embodiments, the information may include one or more logos and/or brands. In some embodiments, the one or more logos and/or brands may include (i) one or more brands and/or logos of one or more national and/or international payment card association such as for example, MasterCard International Incorporated (ii) one or more brands and/or logos of one or more products, such as, for example, Pay Pass, provided by one or more national payment card associations (iii) one or more brands and/or logos of one or more issuers and/or (iv) one or more brands and/or logos of one or more products provided by the one or more issuers. In some embodiments, the information, logos and/or brands may comprise embossed and/or non-embossed numbers and/or letters.

The body 104 may include a front portion 718, a back portion 720 and a portion 723 to retain the front portion 718 to the back portion 720 in a clamshell configuration. In some embodiments, portion 723 comprises a living hinge or other type of hinge that allows the portions 718, 720 to pivot relative to one another. In some embodiments, the portion 723 is defined in part by scoring of the body 104. In some embodiments, the portion 723 comprises material that is bendable and allows the portion 723 to be bent if the body 104 is to be closed.

A second side of the front portion 718 may be releasably retained to a second side of the back portion 720 by a releasable catch 725. In some embodiments, the releasable catch 725 comprises one or more pins 725a defined by one portion, e.g., front portion 718, and one or more sockets 725b defined by the other portion, e.g., back portion 720, adapted to receive the one or more pins 725a. In some embodiments the one or more pins and one or more sockets are sized so as to provide a press fit between the pins and sockets. In such embodiments, some amount of force may need to be applied to one or both portions 718, 720 to insert the one or more pins into the one or more sockets. Upon releasing the releasable catch 725, the second side the front portion 718 and the second side of the back portion 720 may be free to pivot away from one another.

The front portion 718 may have a shape that is the same as and/or similar to that of the back portion 720, such that, with the body 104 in the closed state, the edge of the second side of the front portion 718 may be disposed in register with the edge of the second side of the back portion 720. The second side of the front portion and the second side of the back portion may each be rounded and/or define rounded corners.

Some, or all, of the front portion 718 and/or some, or all, of the back portion 720 may be substantially transparent to allow one or more portions of the proximity payment device 102 to be seen therethrough. In some embodiments, the body 104 may be formed of plastic and/or other suitable material.

The body 104 may define a seat 726 to receive the proximity payment device 102 and to support and/or position the proximity payment device 102, at least in part. In some embodiments, the seat 726 may have a length, a width and/or a height that is the same size as, or slightly larger, than the length, the width and/or the thickness, respectively, of the proximity payment device 102.

The body 104 may further define an opening 730 to receive a ring 732. The ring may comprise a key ring to receive and/or retain one or more keys 734.

The body 104 may support an electrical interface 740, which may include the one or more conductors 118A-118B. Each of the one or more conductors 118A-118B may include a contact portion, represented by contacts 742A-742B, respectively, adapted to contact one or more contacts 212-226 of the proximity payment device 102. As stated above, the one or more conductors 118A-118B may also electrically connect to the one or more conductors 105A-105B, respectively, of the electrical connector 105, to thereby electrically connect one or more of the contacts 212-226 of the proximity payment device 102 to the electrical connector 105. The contacts 742A-742B may be biased (e.g., in the z direction) so as to help insure contact with respective contacts of the proximity payment device 102. In some embodiments, each of the contacts 742A-742B may comprise a spring contact that includes a contact and a spring integral therewith to bias the spring contact (e.g., in the z direction). The body 104 may be adapted to position the proximity payment device 102 relative to the electrical interface 724, at least in part. One or more springs 732 may be provided within the body 104 to bias the proximity payment device 102 toward the electrical interface.

In some embodiments, the electrical connector 105 comprises a USB connector. In such embodiments, the proximity payment device 102 and/or the communication device 106 may be adapted to communicate in accordance with a USB standard such that signals communicated via the connector 105 comply with such standard.

Some embodiments may include a removable cover 750 (FIGS. 7C-7D) to protect the connector 105 if the connector is not in use. A living or other type of hinge, represented by hinge 752 (FIG. 7C), may fixedly attach the removable cover 750 to the body 104.

In some embodiments, the body 104 may further support a display, a power source and/or a controller (not shown). In some embodiments, the proximity payment device 102 may be adapted to be electrically connected to such display, power source and/or controller. In that regard, in some embodiments, one or more of contacts 212-226 may be adapted to be connected to the display, power source and/or controller. Access to a source of electrical power may improve one or more operating characteristics of the proximity payment device 102. In some embodiments, access to a source of electrical power may give the proximity payment device a greater range. In some embodiments, access to a source of electrical power may allow the device to perform a greater number of functions and/or may increase the operating speed of the device.

In some embodiments, one or more logos and/or brands, including for example the brand/logo of a national and/or international payment card association such as MasterCard International Incorporated, may be provided on one or more surfaces of a proximity payment device. The brand/logo of the issuer may also be provided, as well as, for example, a specific card product brand. Embossed or non-embossed numbers and/or letters may be provided on the proximity payment device to indicate one or more account numbers and/or a name of an account holder. Other features that may be provided on the proximity payment device are an adhesive paper strip to receive the signature of the cardholder, and a security code or the like printed on the adhesive strip. In addition, the proximity payment device may have one or more magnetic stripes to allow the proximity payment device to be read by a magnetic card reader.

FIG. 8 is a schematic plan view of the proximity payment device 102 of FIGS. 7A-7D, according to some embodiments. Referring to FIG. 8, in accordance with some embodiments, the proximity payment device 102 has a generally rectangular shaped plastic body 701 having regions 812, 814, 816 provided with one or more brand and/or logo of an issuer or a payment card association and/or one or more brand and/or logo of a product provided by the issuer or payment card association. The plastic body is further provided with a portion of a payment account number 820, an account holder's name 822 and an expiration date 824. The portion of the payment account number 820 includes include six digits that define a first portion of the account number and four digits that define a second portion of the account number. For security, X's are provided in place of six digits of the payment account number. Other configurations may also be employed.

Other features that may be provided on the proximity payment device 102 (though such features are not shown) may include (i) a paper strip or other surface to receive a signature of the cardholder, (ii) a security code, which may be provided on the paper strip, if present, or/and another suitable location and/or (iii) a magnetic stripe (not shown), which may be read by a magnetic card reader and may store some or all of the information that was (or is to be) stored in proximity payment device 102.

Figure 9:
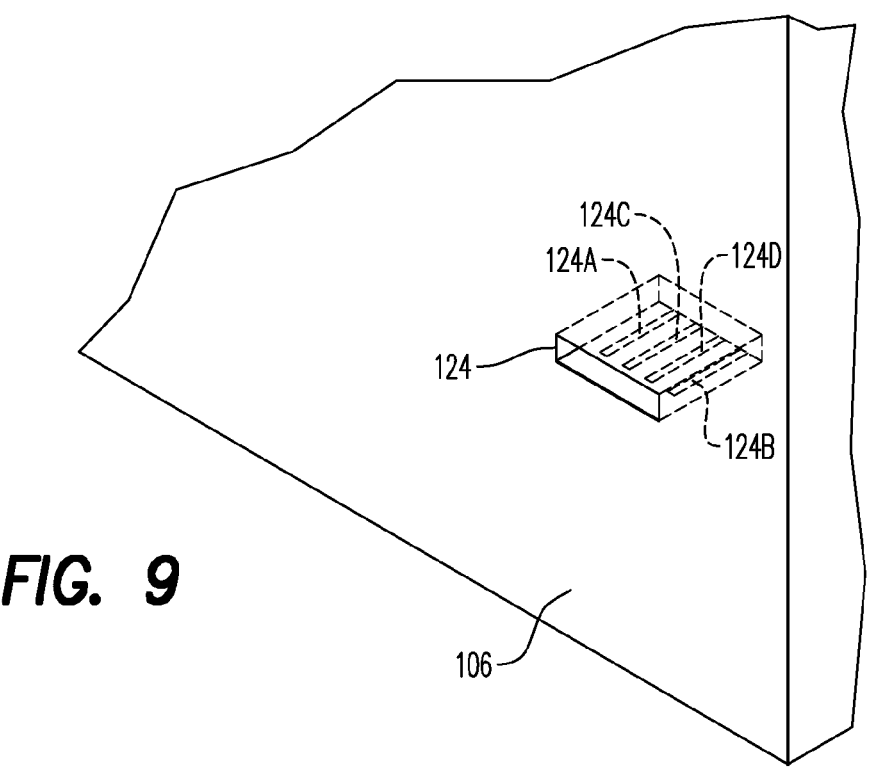
FIG. 9 is a perspective view of a portion of a communication device, according to some embodiments.

FIG. 9 is a perspective view of a portion of the communication device 106, according to some embodiments. Referring to FIG. 9, in accordance with some embodiments, the communication device 106 comprises a personal computer and connector 124 comprises a USB connector.

Figure 10:
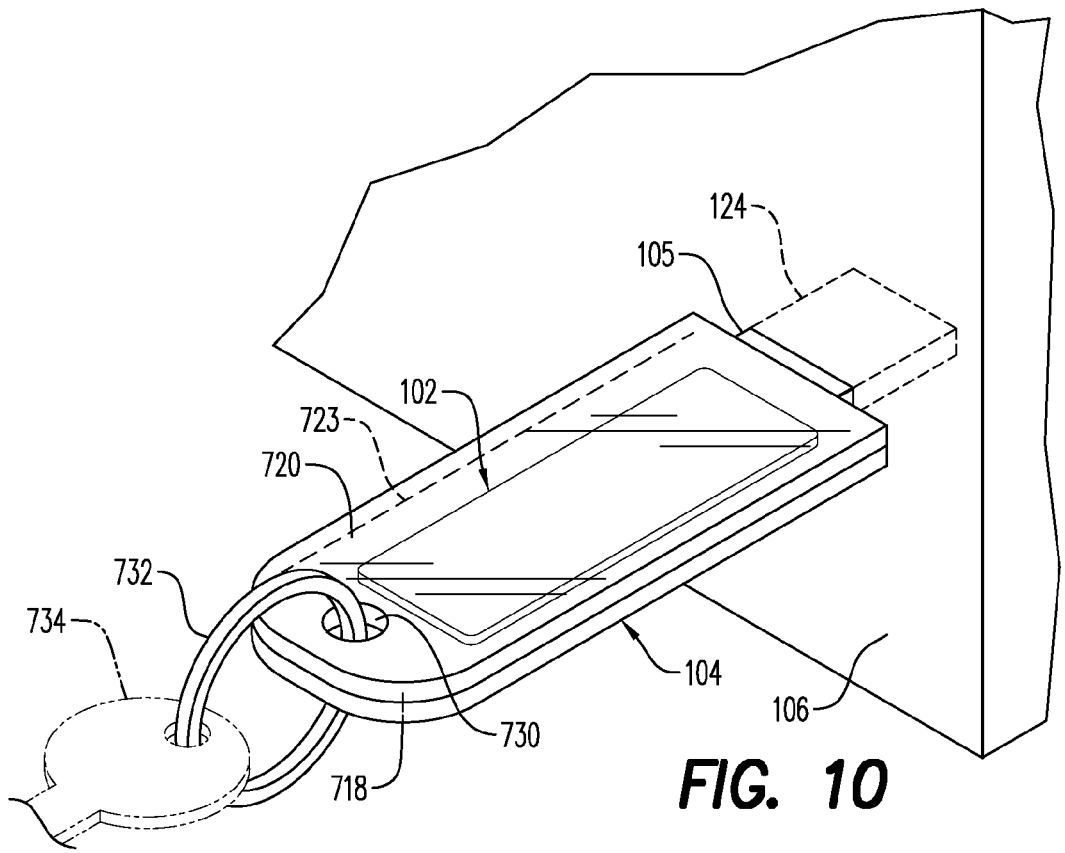
FIG. 10 is a perspective view of a proximity payment device, a body, a connector, and a communication device, according to some embodiments.

FIG. 10 is a perspective view of the proximity payment device 102, the body 104, and the electrical connector 105 of FIGS. 7A-7D in combination with a portion of the communication device 106 of FIG. 9, with the electrical connector 105 mated with the electrical connector 124.

As described above, in operation, the proximity payment device 102 may include an EMV risk parameter and/or other security parameter(s) and may communicate with the communication device 106 via the electrical connector 105. The communication device 106 may communicate with the authorization device 108 to obtain authorization to reset the security parameter in the proximity payment device 102. The communication device 106 may transmit at least one signal to the proximity payment device 102 to indicate authorization to reset the security parameter. The proximity payment device 102 may receive the at least one signal transmitted by the communication device 106 and may reset the security parameter in response, at least in part, thereto.

As stated above, in some embodiments, the body 104 comprises a body of a USB flash drive or other type of mass storage device.

Figure 11A:
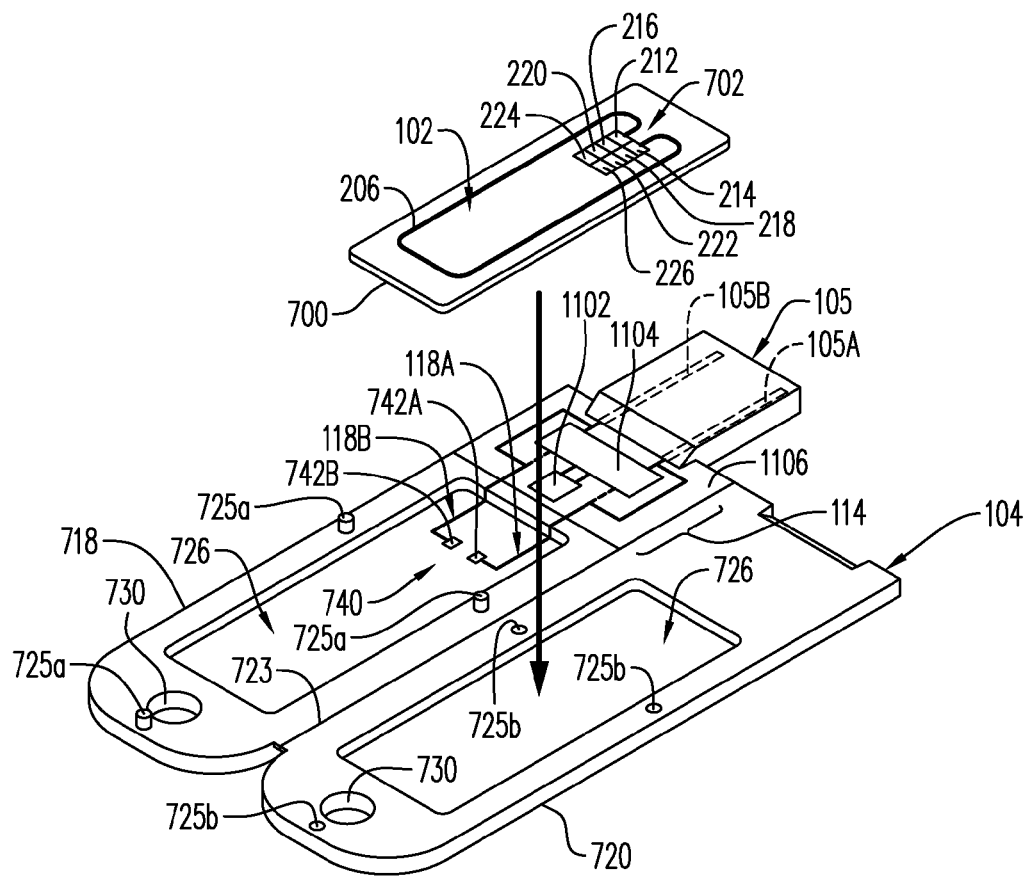
FIGS. 11A-11D are perspective views of a proximity payment device, a body and a connector, according to some embodiments.
Figure 11B:
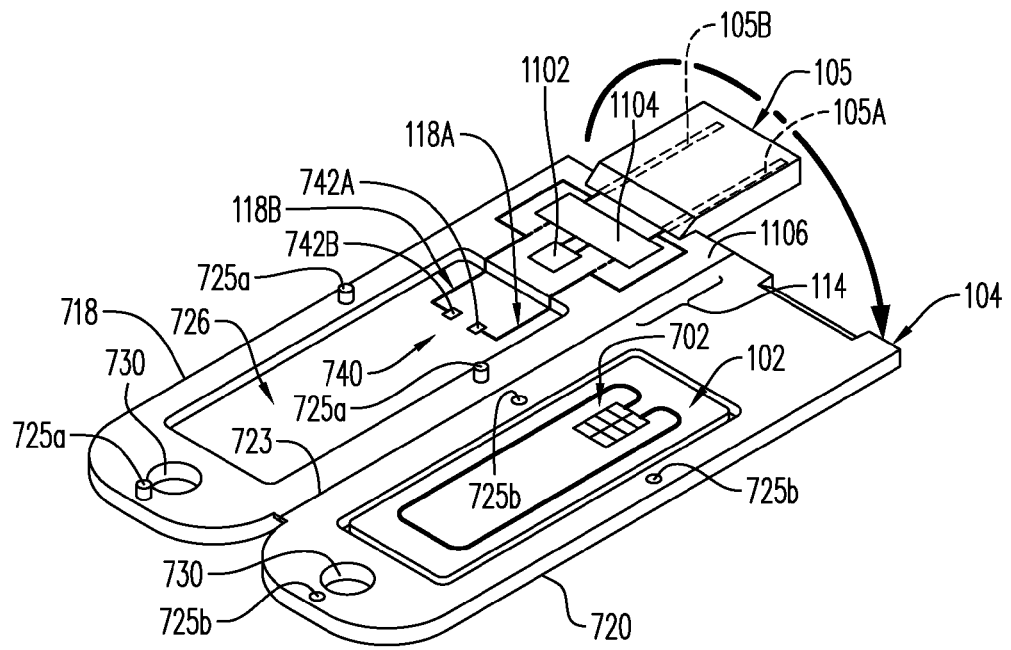
Figure 11C:
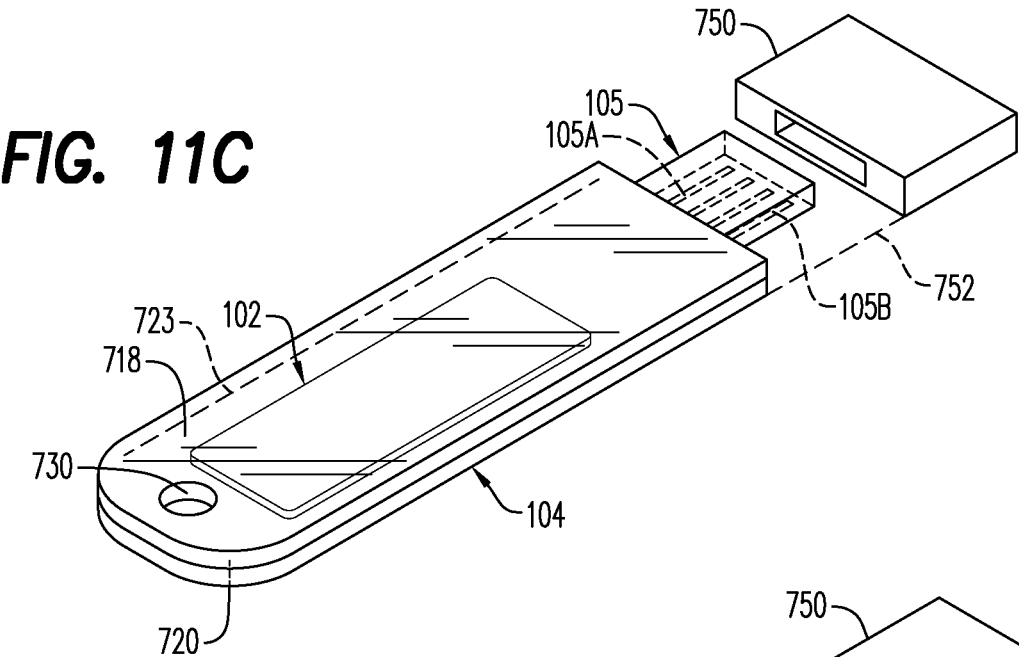
Figure 11D:
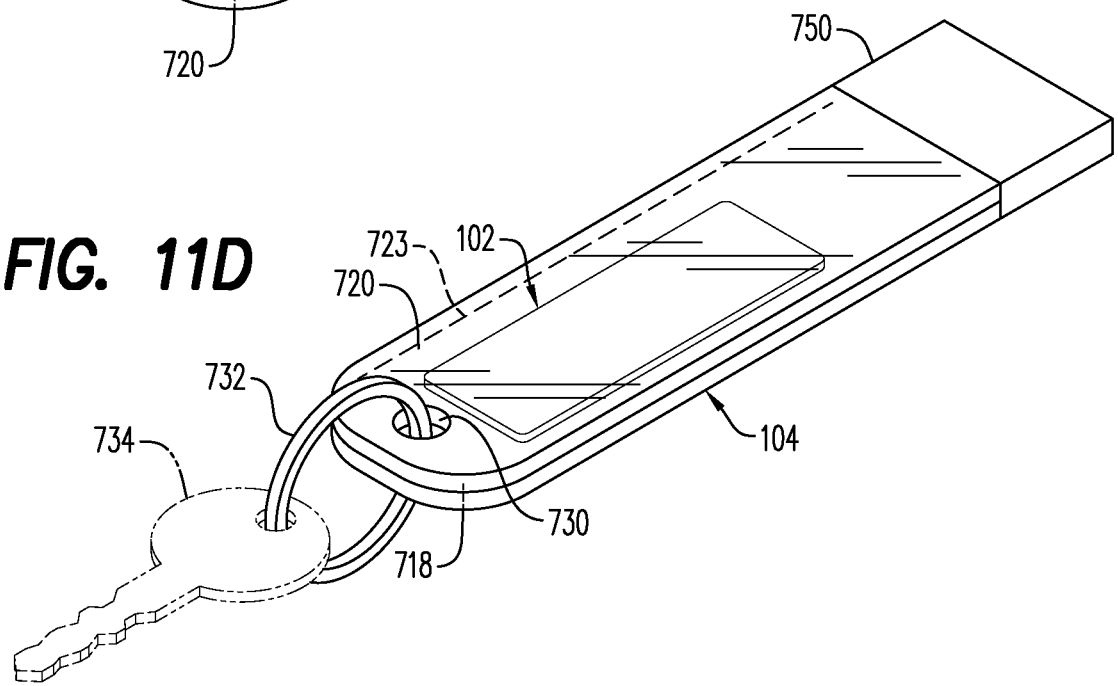

FIGS. 11A-11D are perspective views of the proximity payment device 102, the body 104 and connector 105, according to some embodiments, in which the body comprises the body of a USB flash drive or other type of mass storage device. More particularly, FIG. 11A is a perspective view of the proximity payment device 102, the body 104 and connector 105, according to some embodiments, with the body 104 in an open state, prior to installing the proximity payment device 102 therein. FIG. 11B is a perspective view of the proximity payment device 102 installed in the body 104, according to some embodiments, with the body 104 in an open state. FIGS. 11C-11D are perspective views of the proximity payment device 102 installed in the body 104, according to some embodiments, with the body 104 in a closed state.

Referring to FIGS. 11A-11D, in accordance with some embodiments, the proximity payment device 102, body 104 and connector 105 may be similar to the proximity payment device 102, body 104 and connector 105, respectively, described above with respect to FIGS. 7A-7D, except that the body 104 further supports a mass storage system 114.

In accordance with some embodiments, the mass storage system 114 may be coupled to the electrical connector 105. If the connector 105 comprises a USB connector, the mass storage system 114 may be adapted to operate in accordance with a USB mass storage device standard.

In operation, the mass storage system 114 may receive a request to store information, and in response thereto, the system 114 may store such information. The mass storage system 114 may receive the request and/or the information via the connector 105. The mass storage system 114 may further receive a request for information, and in response thereto, the mass storage system 114 may supply such information. The mass storage system 114 may receive the request for information and/or may supply the information via the connector 105.

In some embodiments, the mass storage system 114 includes a memory 1102 and a controller 1104. The memory 1102 and the controller 1104 may be mounted on a printed circuit board 1106. The memory 1102 may be coupled to the controller 1104. The controller 1104 may be coupled to the connector 105. If the connector 105 comprises a USB connector, the memory 1102 and/or controller 1104 may operate in accordance with a USB mass storage device standard. The memory 1102 may comprise flash memory and/or other circuitry. The controller 1104 may comprise a USB controller and/or other circuitry. Flash memory may comprise EEPROM. In some embodiments, the memory 1102 comprises a storage capacity of at least 1 Mbyte. In some embodiments, the memory 1102 comprises a storage capacity of at least 1 Gbyte.

In operation, the controller 1104 may receive a request to store information and may supply the request and the information to the memory 1102. The controller 1104 may receive the request and/or the information via the connector 105. The memory 1102 may receive the request supplied by the controller 1104 and may store the information in response thereto.

The controller 1104 may further receive a request for information and may supply the request to the memory 1102. In some embodiments, the controller 1104 receives the request via the connector 105. The memory 1102 may receive the request supplied by the controller 1104, and in response thereto, may retrieve and supply the information to the controller 1104. The controller may receive the information supplied by the memory 1102 and may supply the information via the connector 105.

In some embodiments, an alternative configuration of conductors 118A-118B (see dotted lines) couple proximity payment device 102 to controller 1104 rather than to connector 105. In such embodiments, the proximity payment device 102 may receive and/or transmit signals via the controller 1104. In some embodiments, all signals received from, and/or transmitted to, the connector 105 are received and/or transmitted via the controller 1104.

The controller 1104 may receive signals via the connector 105 and may determine whether the signals are associated with the proximity payment device 102 or the memory 1102. If the controller 1104 determines that the signals are associated with the proximity payment device 102, the controller 1104 may supply the signals to the proximity payment device 102. If the controller 1104 determines that the signals are associated with the memory 1102, the controller 1104 may supply the signals to the memory 1102. The controller 1104 may further receive signals from the proximity payment device 102 and/or memory 1102, and in response thereto, the controller 1104 may supply the signals to the connector 105.

In some embodiments, the proximity payment device 102, the memory 1102 and the controller 1104 are disposed in separate packages. However, other configurations may also be employed.

Some embodiments may not include all of the features described above. In some embodiments, one or more signals received and/or transmitted via the connector 105 are not related to a security parameter and/or authorization to reset a security parameter.

In some embodiments, the proximity payment device 102 may not have and/or reset a security parameter in response to a signal received from the communication device 106.

Figure 12:
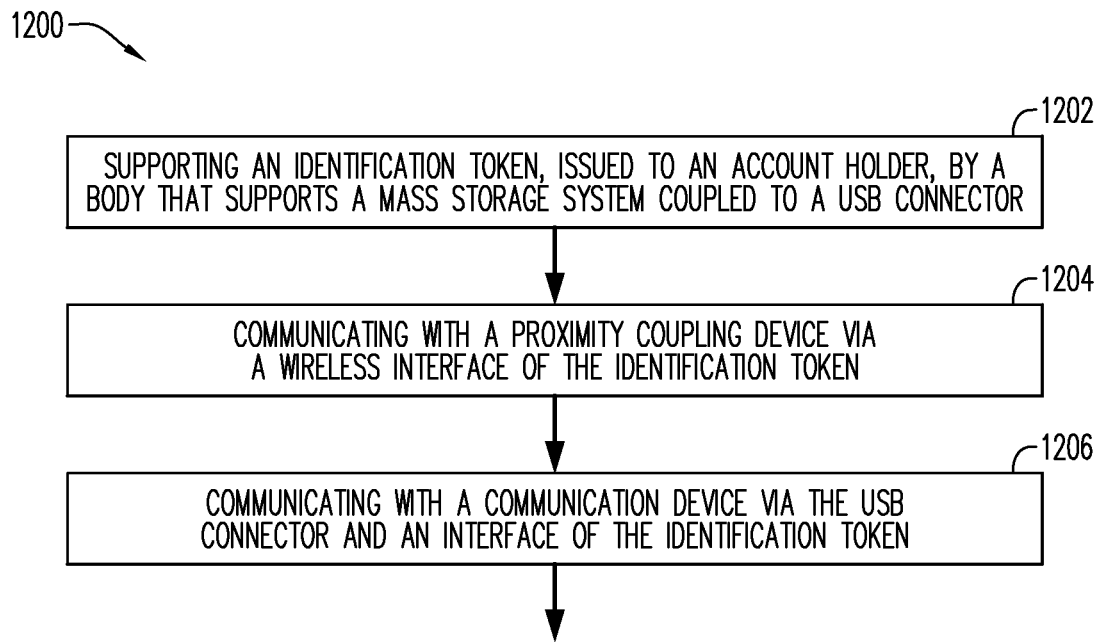
FIG. 12 is a flow chart that illustrates a method, according to some embodiments.

FIG. 12 shows a flow chart 1200 of a method, according to some embodiments. In some embodiments, one or more portions the method may be used in association with the proximity payment device 102, the body 104, the electrical connector 105, the communication device 106 and/or the system 114 described above with respect to FIGS. 11A-11D. Notably, some embodiments may employ one or more portions of the method without one or more other portions of the method.

Referring to FIG. 12, at 1202, the method may include supporting an identification token, issued to an account holder, by a body that supports a mass storage system coupled to a USB connector.

At 1204, the method may further include communicating with a proximity coupling device via a wireless interface of the identification token.

At 1206, the method may further include communicating with a communication device via the USB connector and an interface of the identification token.

Figure 13:
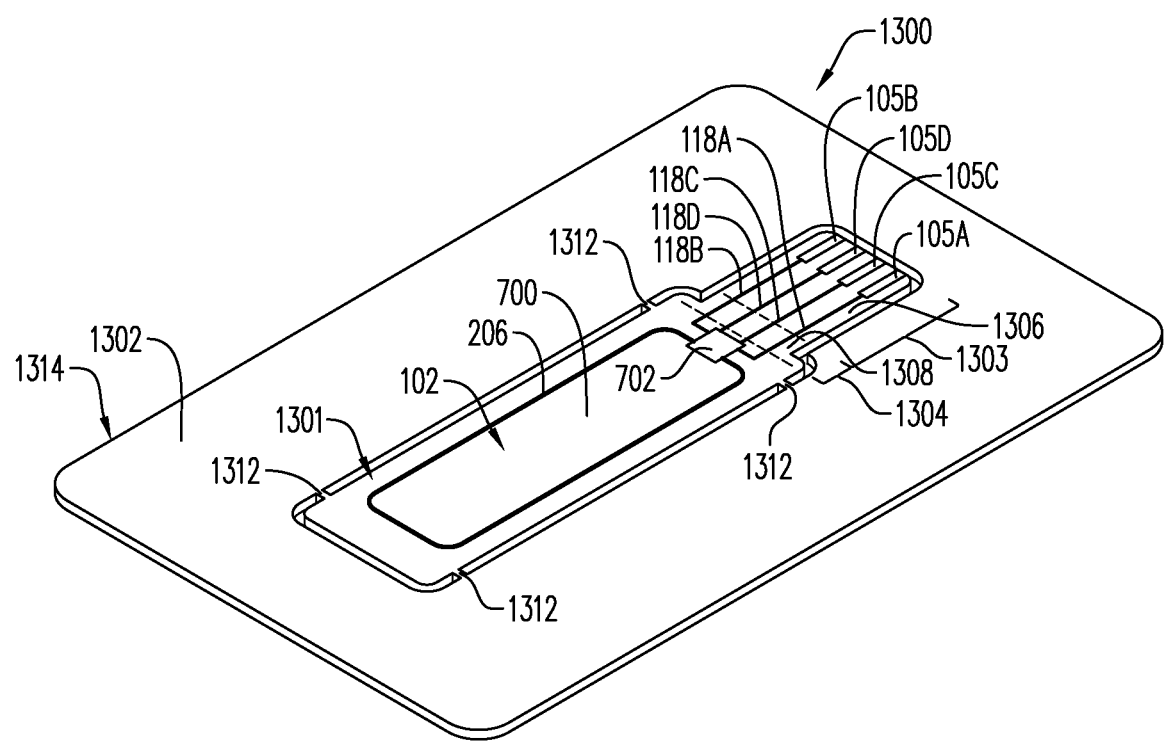
FIG. 13 is a perspective view of a structure, according to some embodiments.

FIG. 13 is a schematic perspective view of a structure 1300, according to some embodiments. Referring to FIG. 13, in accordance with some embodiments, the structure 1300 includes an insert 1301 and a carrier 1302 for same.

The insert 1301 may include a proximity payment device 102, a portion 1303 of connector 105 and a coupler 1304. The proximity payment device 102 includes a body 700, an RFID IC 702 and an antenna 206. In some embodiments, the RFID IC 702 includes the control/storage circuit 204, the transmit/receive circuitry 208 and the contact interface 210 (FIG. 2).

The portion 1303 of connector 105 includes a body 1306 and a plurality of electrical conductors, represented by conductors 105A-105D, supported by the body 1306. As further described below, the portion of connector 105 is adapted to be inserted into a shell portion 1308 (FIGS. 13A-13B) of connector 105. The plurality of conductors 105A-105D may be adapted to make electrical contact with a plurality of electrical conductors, represented by electrical conductors 124A-124D, respectively, of electrical connector 124. In some embodiments, electrical connector 105 comprises a USB connector having a male plug and electrical connector 124 comprises a USB connector have a female receptacle to receive the male plug of electrical connector 105.

The coupler 1304 includes a body 1308 and a plurality of electrical conductors, represented by electrical conductors 118A-118D, supported by the body 1308. The body 1308 of the coupler 1304 couples the body 700 of proximity payment device 102 to the body 1306 of the portion 1303 of connector 105. The plurality of electrical conductors 118A-118D couple the electrical conductors 105A-105D, respectively, to the proximity payment device 102.

The body 700, the body 1306 and the body 1308 may be defined by a body 1310. In some embodiments, the body 1310 is one piece and/or generally card shaped. Tabs 1312 may join the body 1310 to the carrier 1302.

In some embodiments, the carrier 1302, the body 1310 and tabs 1312 are formed from a blank 1314. In some embodiments, the carrier 1302, the body 1310 and tabs 1312 are formed by punching, scoring, machining, etching and/or otherwise processing the blank 1314.

In some embodiments, the blank 1314 is card shaped or at least generally card shaped. In some embodiments, the blank 1314 has dimensions defined for a standard card referred to as "ID1" in ISO/IEC standard 7810, promulgated by the International Standardization Organization and other bodies.

In some embodiments, the blank 1314 comprises a multi-layer laminate. In some embodiments. One or more layers of the multi-layer laminate may be card shaped and formed of plastic or other suitable material. One or more conductive layers may define the antenna 206, the plurality of conductors 118A-118D and/or the plurality of conductors 105A-105D. In some embodiments, one or more of such conductive layers comprises e-paper. In some embodiments, one or more of the conductive layers are disposed between two other layers of the multi-layer laminate. In other embodiments, one or more of the conductive layers define an outer layer of the multi-layer laminate.

The RFID IC 702 may be attached to the body 700 before, during and/or after forming the carrier 1302, the body 1310 and tabs 1312

In some embodiments, the insert 1301 is detached from the carrier 1302 and inserted in a device. In some embodiments, this may be done by an account holder, after the structure 1300 is issued to an account holder 112. In some embodiments, this may be done prior to issuing any part of the structure 1300 to the account holder 112. In some embodiments, the detaching of the insert 1301 from the carrier 1302 is accomplished by breaking tabs 1312.

In some embodiments, the insert 1301 may further comprise the mass storage system 114 (FIGS. 11A-11D).

In some embodiments, "pre-personalization" and/or "personalization" of proximity payment device 102 may be performed prior to detaching the insert 1302 from the carrier 1302.

Figure 14A:
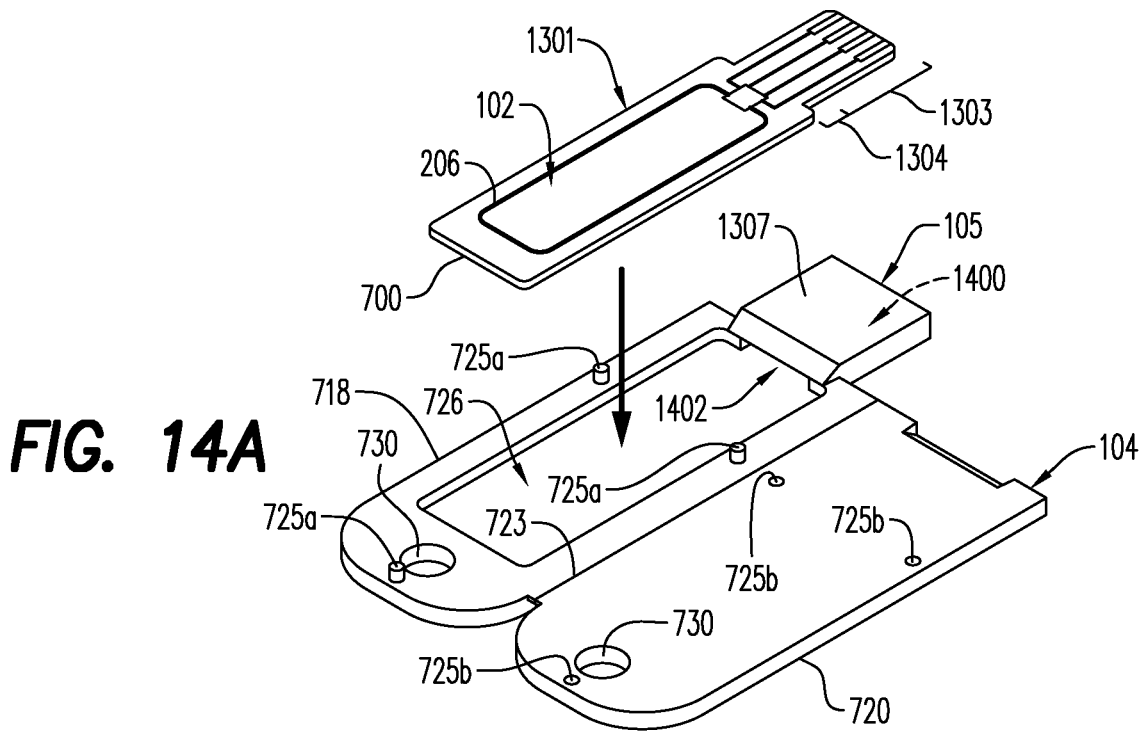
FIGS. 14A-14D are perspective views of an insert, a body and a connector, according to some embodiments.
Figure 14B:
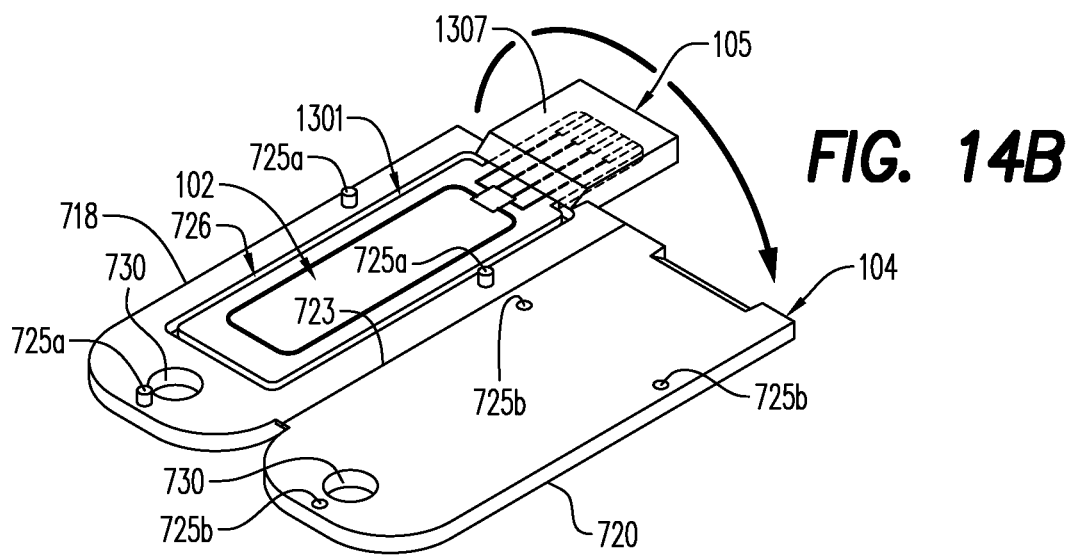
Figure 14C:
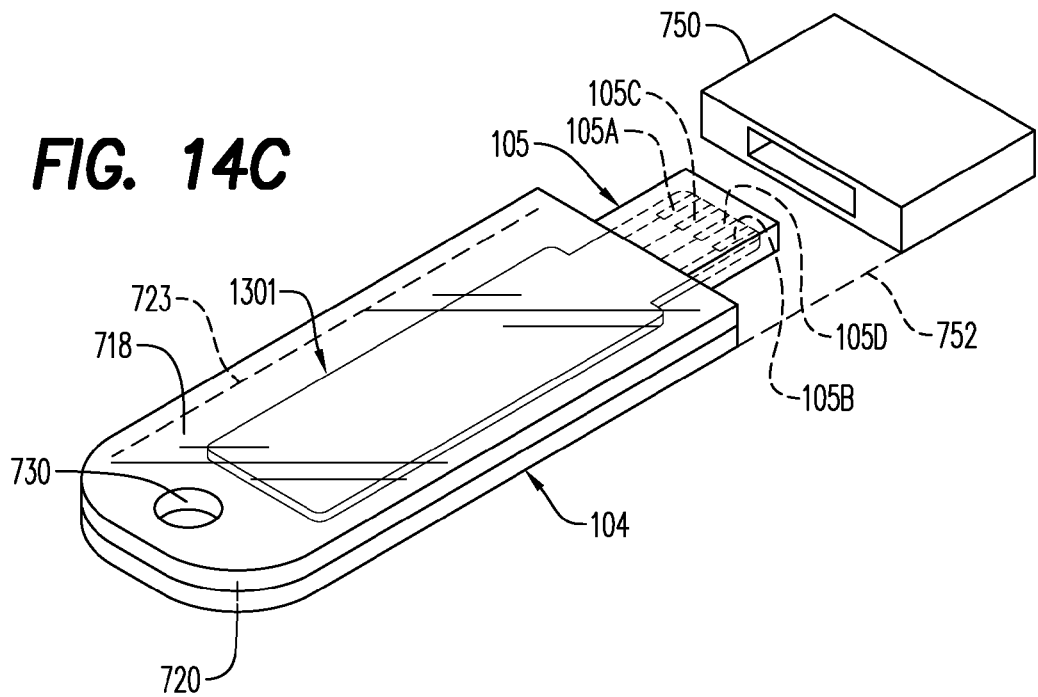
Figure 14D:
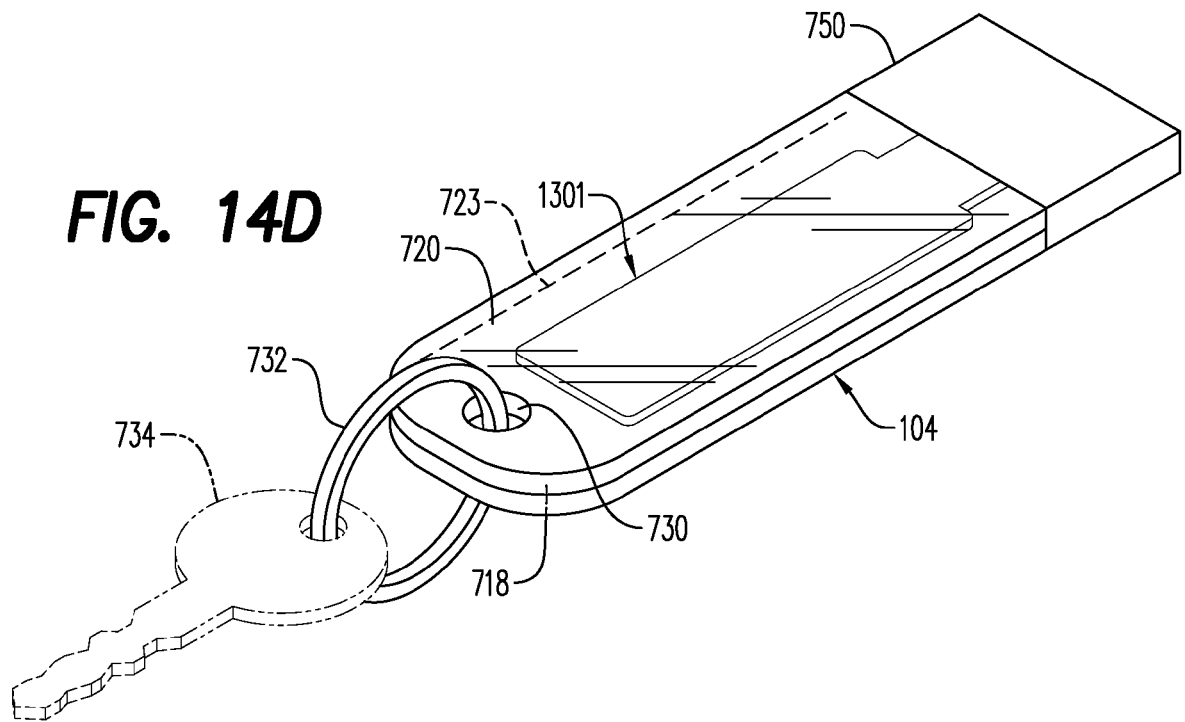

FIGS. 14A-14D are perspective views of the insert 102, the body 104 and a shell portion 1307 of connector 105, according to some embodiments. More particularly, FIG. 14A is a perspective view of the insert 1301, the body 104 and shell portion 1307 portion of the connector 105, according to some embodiments, after the insert 1301 has been detached from the carrier 1302, prior to inserting the insert 1301 into the body 104 and the shell portion 1307 of connector 105. FIG. 14B is a perspective view of the insert 1301 inserted in the body 104 and the shell portion 1307 of the connector 105, according to some embodiments, with the body 104 in an open state. FIGS. 14C-14D are perspective views of the insert 1301 inserted in the body 104 and the shell portion 1307 of the connector 105, according to some embodiments, with the body 104 in a closed state.

Referring to FIGS. 14A-14D, in accordance with some embodiments, the shell portion 1307 of connector 105 defines at least one opening 1400 in communication with a channel 1402. The insert 1301 may be inserted into the body 104. The connector portion 1303 may thereafter be inserted through the at least one opening 1400 and into the channel 1402. With such positioning, the plurality of conductors 105A-105D may be positioned to make electrical contact with a plurality of electrical conductors, represented by electrical conductors 124A-124D, respectively, of electrical connector 124. Thereafter, the body 104 may be closed and the connector 105 may be mated to the connector 124. Thereafter, one or more of the methods described above may be employed. Other orders and/or methods may also be employed in addition and/or in lieu thereof.

Figure 15:
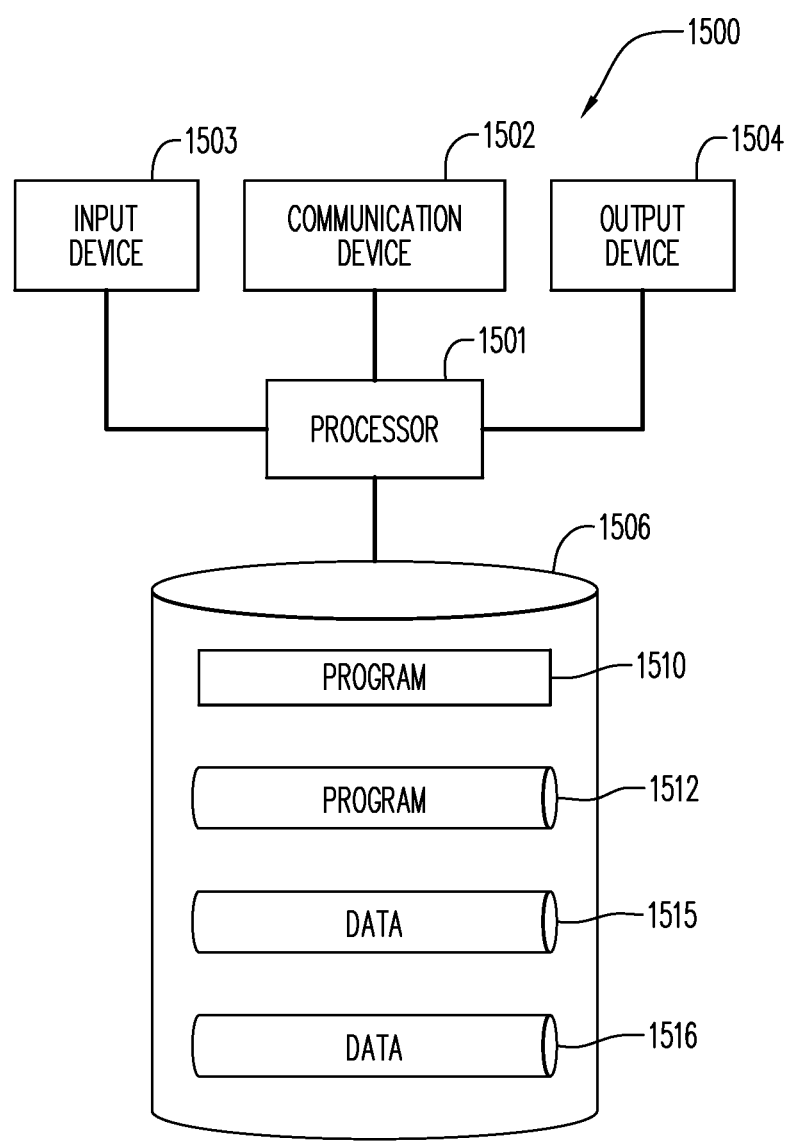
FIG. 15 is a schematic block diagram of an architecture, according to some embodiments.

FIG. 15 is a block diagram of an architecture 1500 according to some embodiments.

In some embodiments, one or more of the systems, devices and/or circuitry (or portion(s) thereof) disclosed herein may have an architecture that is the same as and/or similar to one or more portions of the architecture 1500. Referring to FIG. 15, in accordance with some embodiments, the architecture 1500 includes a processor 1501 operatively coupled to a communication device 1502, an input device 1503, an output device 1504 and a storage device 1506.

In some embodiments, the processor 1501 may execute processor-executable program code to provide one or more portions of the one or more functions disclosed herein and/or to carry out one or more portions of one or more embodiments of one or more methods disclosed herein. In some embodiments, the processor 1501 may be a conventional microprocessor or microprocessors.

The communication device 1502 may be used to facilitate communication with other devices and/or systems. In some embodiments, communication device 1502 may be configured with hardware suitable to physically interface with one or more external devices and/or network connections. For example, communication device 1502 may comprise an Ethernet connection to a local area network through which architecture 1500 may receive and transmit information over the Internet and/or one or more other network(s).

The input device 1503 may comprise, for example, one or more devices used to input data and/or other information, such as, for example: a keyboard, a keypad, track ball, touchpad, a mouse or other pointing device, a microphone, knob or a switch, an infra-red (IR) port, etc. The output device 1504 may comprise, for example, one or more devices used to output data and/or other information, such as, for example: an IR port, a dock, a display, a speaker, and/or a printer, etc.

The storage device 1506 may comprise, for example, one or more storage devices, such as, for example, magnetic storage devices (e.g., magnetic tape and hard disk drives), optical storage devices, and/or semiconductor memory devices such as Random Access Memory (RAM) devices and Read Only Memory (ROM) devices.

The storage device 1506 may store one or more programs 1510-1512, which may include one or more instructions to be executed by the processor 1501.

In some embodiments, the one or more programs may include one or more operating systems, database management systems, other applications, other information files, etc., for operation of the architecture 1500.

The storage device 1506 may store data 1514-1516 and/or other information for one or more programs. In some embodiments, the data 1514-1516 and/or other information may be stored in one or more databases. As used herein a "database" may refer to one or more related or unrelated databases. Data and/or other information may be stored in any form. In some embodiments, data and/or other information may be stored in raw, excerpted, summarized and/or analyzed form.

In some embodiments, one or more portions of one or more embodiments disclosed herein may be embodied in a method, an apparatus, a computer program product, and/or an article where the article includes a storage medium readable by a processor.

As used herein, a signal may be any type of signal, i.e., a physical quantity (e.g., voltage, current, or magnetic field strength), an indication, a message and/or any other type of signal or combination thereof. A voltage, current, or magnetic field strength may be analog, digital, single ended signal, differential and/or any other type or combination thereof.

A wireless communication interface may be any type of wireless communication interface.

A circuit may be programmable or non programmable, general purpose or special purpose, dedicated or non dedicated, distributed or non distributed, shared or not shared, and/or any combination thereof. If the circuit has two or more distributed portions, the two or more portions may communicate with one another through a communication link. A circuit may include, for example, but is not limited to, hardware, software, firmware, hardwired circuits and/or any combination thereof.

A proximity payment device refers to any device, of any shape, which transmits to a point of sale terminal, by wireless transmission, a payment account number. As used herein, a payment account number may be numeric, non numeric and/or a combination thereof.

In some embodiments, a proximity payment device may also have a contact interface like that of a conventional smart card that includes a contact interface.

Some of the principles taught herein have been described in the context of an EMV risk parameter and/or resetting an EMV risk parameter. However, these teachings are also applicable to any type of security parameter and/or resetting any type of security parameter.

In addition, some of the principles taught herein have heretofore been described in the context of proximity payment devices. Nevertheless, these teachings are also applicable to any type of identification token. As used herein, the term "identification token" refers to a device, having a card shape or any other shape, that serves as one or more of a proximity payment device; a transportation related device; an identification device to identify the holder for purposes apart from or in addition to transaction payments (e.g., to identify medical patients and/or individuals insured by health insurance plans); a device used to portably store medical record information; stored value card(s); and to so-called electronic passports (also known as RFID-enabled passports) and/or a source of any type of information associated with a holder of the identification token (and/or the holder of the card installed therein).

The term "transportation related device" refers to a card or other device used to pay, or confirm or evidence payment of, a charge for using a transportation system and/or cards or the like issued by transportation systems (e.g., mass transit systems) for access to the transportation systems. The term "RFID-enabled passport" refers to an internationally recognized travel document that includes an IC and an antenna and communicates with a terminal by a wireless communication technique. The term "information" may include but is not limited to a name, a social security number, an account number, an expiration date, a security code and/or medical information.

Thus, unless stated otherwise, an account holder may include, but is not limited to, any person and/or entity having access to an identification token and/or any accounts associated therewith.

As used herein, an account number may be numeric, non numeric and/or a combination thereof.

Unless otherwise stated, terms such as, for example, "in response to" and "based on" mean "in response at least to" and "based at least on", respectively, so as not to preclude being responsive to and/or based on, more than one thing.

In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method comprising:
supporting an identification token, issued to an account holder, by a non-card shaped body of a device issued to the account holder;
communicating with a proximity coupling device via a wireless interface of the identification token;
electrically connecting a communication device to an electrical connector attached to the non-card shaped body;
communicating with the communication device via the electrical connector; and
resetting a security parameter in the identification token in response, at least in part, to at least one signal from the communication device and without requiring a transfer of money from the account holder in return for the resetting of the security parameter in the identification token;
wherein the communication device includes a counter indicative of a number of occasions that the communication device may be used in resetting the security parameter in the identification token.

2. The method of claim 1 wherein communicating with the communication device comprises:
receiving the at least one signal from the communication device via the electrical connection; and
transmitting at least one signal from the identification token to the communication device via the electrical connection.

3. The method of claim 1 wherein the identification token comprises a proximity payment device.

4. The method of claim 1 wherein communicating with the proximity coupling device via the wireless interface comprises transmitting at least one of:
an account number; and
a name of a person.

5. The method of claim 1 wherein the security parameter comprises a security parameter based at least in part on at least one of:
a number of transactions that have been made using the identification token; and
an amount that has been spent using the identification token.

6. The method of claim 1 wherein the security parameter comprises an EMV risk parameter.

7. The method of claim 1 further comprising disabling use of the identification token if the security parameter does not satisfy a criteria.

8. The method of claim 1 wherein the non-card shaped body encloses the identification token.

9. The method of claim 1 wherein the non-card shaped body comprises a body of at least one of: a cell phone, a wristwatch, a portable data assistant, a music player, a key fob and a USB flash drive.

10. The method of claim 1 wherein the connector comprises a USB connector.

11. The method of claim 1 further comprising providing a human detectable indication that security parameter has been reset.

12. The method of claim 1 further comprising:
transmitting a request for authorization to reset the security parameter from the identification token to the communication device; and
after the transmitting of the request for authorization to reset the security parameter from the identification token to the communication device, receiving, from the communication device, an authorization to reset the security parameter;
wherein the resetting a security parameter in the identification token in response, at least in part, to at least one signal from the communication device comprises:
resetting the security parameter in the identification token in response, at least in part, to the authorization to reset the security parameter that is received from the communication device after the transmitting of the request for authorization to reset the security parameter from the identification token to the communication device.

13. The method of claim 1 further comprising:
receiving, from the communication device, an authorization to reset the security parameter;
wherein the authorization to reset the security parameter expires if it is not transmitted to the identification token with a certain period of time; and
wherein the resetting a security parameter in the identification token in response, at least in part, to at least one signal from the communication device comprises:
resetting the security parameter in the identification token in response, at least in part, to the authorization to reset the security parameter that is received from the communication device and expires if it is not transmitted to the identification token with a certain period of time.

14. The method of claim 1 wherein the resetting a security parameter in the identification token in response, at least in part, to at least one signal from the communication device and without requiring a transfer of money from the account holder in return for the resetting of the security parameter in the identification token comprises:
resetting a security parameter in the identification token in response, at least in part, to at least one signal that is from the communication device and supplied by the communication device only after it has been determined that an account represented by an account number in the identification token is in good standing.

15. The method of claim 1 wherein the security parameter that is in the identification token and reset in response, at least in part, to the at least one signal from the communication device, comprises:

a security parameter that is also resetable by positioning the identification token within range of a proximity coupling device of a point of sale system for an amount of time needed for reset of the security parameter in the identification token.

16. The method of claim 1 wherein the security parameter that is in the identification token and reset in response, at least in part, to the at least one signal from the communication device, comprises:
a security parameter that is automatically reset if: (1) the identification token has been used in a predetermined number of transactions and/or the identification token has been used to spend a predetermined amount, (2) an account represented by the account number in identification token is in good standing, (3) the identification token has not been reported lost and (4) the identification token is held within range of a point of sale system for an amount of time needed to reset the security parameter.

17. The method of claim 1 further comprising:
resetting the counter so that the communication device may again be used in resetting the security parameter in the identification token.

18. The method of claim 1 wherein the communication device includes information that defines a schedule for requesting authorization to reset the security parameter in the identification token.

19. The method of claim 18 wherein one or more portions of the information that is included in the communication device and defines the schedule for requesting authorization to reset the security parameter in the identification token is based at least in part on data supplied by the account holder.

20. Apparatus comprising:
an identification token issued to an account holder and having a wireless interface;
a non-card shaped body that encloses the identification token; and
an electrical connector attached to the non-card shaped body and adapted to be electrically connected to a communication device;
the identification token to communicate with a proximity coupling device via the wireless interface, to communicate with the communication device via the electrical connector, and to reset a security parameter in the identification token in response, at least in part, to at least one signal from the communication device and without requiring a transfer of money from the account holder in return for the reset of the security parameter in the identification token;
wherein the communication device includes a counter indicative of a number of occasions that the communication device may be used in resetting the security parameter in the identification token.

21. The apparatus of claim 20 wherein the identification token to communicate with the communication device comprises an identification token to:
receive the at least one signal from the communication device via the electrical connector; and
transmit at least one signal to the communication device via the electrical connector.

22. The apparatus of claim 20 wherein the identification token comprises a proximity payment device.

23. The apparatus of claim 20 the identification token to communicate with the proximity coupling device via the wireless interface comprises an identification token to transmit at least one of:
an account number; and
a name of a person.

24. The apparatus of claim 20 wherein the security parameter comprises a security parameter based at least in part on at least one of:
a number of transactions that have been made using the identification token; and
an amount that has been spent using the identification token.

25. The apparatus of claim 20 wherein the security parameter comprises an EMV risk parameter.

26. The apparatus of claim 20 wherein the identification token is further to disable use of the identification token if the security parameter does not satisfy a criteria.

27. The apparatus of claim 20 wherein the non-card shaped body encloses the identification token.

28. The apparatus of claim 20 wherein the non-card shaped body comprises a body of at least one of: a cell phone, a wristwatch, a portable data assistant, a music player, a key fob and a USB flash drive.

29. The apparatus of claim 20 wherein the connector comprises a USB connector.

30. A method comprising:
supporting an identification token, issued to an account holder, by a non-card shaped body;
communicating with a proximity coupling device via a wireless interface of the identification token;
electrically connecting a communication device, issued to an account holder, to an electrical connector attached to the non-card shaped body;
communicating with the communication device via the electrical connector;
and
resetting a security parameter in the identification token in response, at least in part, to at least one signal from the communication device and without requiring a transfer of money from the account holder in return for the resetting of the security parameter in the identification token;
wherein the communication device includes a counter indicative of a number of occasions that the communication device may be used in resetting the security parameter in the identification token.

31. The method of claim 30 further comprising providing a human detectable indication that the security parameter has been reset.

32. Apparatus comprising:
a body;
a USB connector attached to the body;
a mass storage system supported by the body, the mass storage device coupled to the USB connector and to communicate via the USB connector; and
an identification token issued to an account holder and supported by the body, the identification token having a wireless interface to communicate with a proximity coupling device, the identification token further having an interface coupled to the USB connector to communicate via the USB connector;
wherein the identification token is to reset a security parameter in the identification token in response, at least in part, to at least one signal from a communication device electrically connected to the USB connector and without requiring a transfer of money from the account holder in return for the reset of the security parameter in the identification token; and
wherein the communication device includes a counter indicative of a number of occasions that the communication device may be used in resetting the security parameter in the identification token.

33. The apparatus of claim 32 wherein the mass storage system comprises a mass storage system to:
  receive information via the USB connector;
  store the information;
  retrieve the information; and
  supply the retrieved information via the USB connector.

34. The apparatus of claim 33 wherein the mass storage system comprises a USB controller and flash memory coupled to the USB controller.

35. The apparatus of claim 32 wherein the body comprises a body of a USB flash drive.

36. The apparatus of claim 32 wherein the identification token comprises a proximity payment device.

37. The apparatus of claim 36 wherein the body comprises a body of a USB flash drive.

38. The apparatus of claim 36 wherein the proximity payment device comprises a proximity payment device to reset a security parameter in the proximity payment device in response, at least in part, to at least one signal from the communication device.

39. The apparatus of claim 38 wherein the security parameter comprises a security parameter based at least in part on at least one of:
  a number of transactions that have been made using the proximity payment device; and
  an amount that has been spent using the proximity payment device.

40. The apparatus of claim 39 wherein the body comprises a body of a USB flash drive.

41. A method comprising:
  supporting an identification token, issued to an account holder, by a body that supports a mass storage system coupled to a USB connector;
  communicating with a proximity coupling device via a wireless interface of the identification token; and
  communicating with a communication device via the USB connector and an interface of the identification token;
  wherein the identification token is to reset a security parameter in the identification token in response, at least in part, to at least one signal from the communication device and without requiring a transfer of money from the account holder in return for the resetting of the security parameter in the identification token;
  wherein the communication device includes a counter indicative of a number of occasions that the communication device may be used in resetting the security parameter in the identification token.

42. The method of claim 41 wherein the body comprises a body of a USB flash drive.

43. A method comprising:
  supporting an identification token, issued to an account holder, by a non-card shaped body of a device issued to the account holder;
  communicating with a proximity coupling device via a wireless interface of the identification token;
  electrically connecting a communication device to an electrical connector attached to the non-card shaped body;
  communicating with the communication device via the electrical connector; and
  resetting a security parameter in the identification token in response, at least in part, to at least one signal from the communication device and without requiring a transfer of money from the account holder in return for the resetting of the security parameter in the identification token;
  wherein the communication device includes information that defines a schedule for requesting authorization to reset the security parameter in the identification token.

44. The method of claim 43 wherein one or more portions of the information that is included in the communication device and defines the schedule for requesting authorization to reset the security parameter in the identification token is based at least in part on data supplied by the account holder.

45. The method of claim 43 wherein the information that is included in the communication device and defines a schedule for requesting authorization to reset the security parameter in the identification token comprises:
  a schedule for the communication device to request, from an authorization device operated by the issuer, the authorization to reset the security parameter in the identification token.

46. Apparatus comprising:
  an identification token issued to an account holder and having a wireless interface;
  a non-card shaped body that encloses the identification token; and
  an electrical connector attached to the non-card shaped body and adapted to be electrically connected to a communication device;
  the identification token to communicate with a proximity coupling device via the wireless interface, to communicate with the communication device via the electrical connector, and to reset a security parameter in the identification token in response, at least in part, to at least one signal from the communication device and without requiring a transfer of money from the account holder in return for the reset of the security parameter in the identification token;
  wherein the communication device includes information that defines a schedule for requesting authorization to reset the security parameter in the identification token.

47. The apparatus of claim 46 wherein one or more portions of the information that is included in the communication device and defines the schedule for requesting authorization to reset the security parameter in the identification token is based at least in part on data supplied by the account holder.

48. The apparatus of claim 46 wherein the information that is included in the communication device and defines a schedule for requesting authorization to reset the security parameter in the identification token comprises:
  a schedule for the communication device to request, from an authorization device operated by the issuer, the authorization to reset the security parameter in the identification token.

\* \* \* \* \*